(12) United States Patent
Shen et al.

(10) Patent No.: US 10,475,209 B2
(45) Date of Patent: Nov. 12, 2019

(54) CAMERA CALIBRATION

(71) Applicant: SZ DJI Technology Co., Ltd., Shenzhen (CN)

(72) Inventors: Yu Shen, Shenzhen (CN); Ang Liu, Shenzhen (CN); Guyue Zhou, Shenzhen (CN)

(73) Assignee: SZ DJI TECHNOLOGY CO., LTD., Shenzhen (CN)

(*) Notice: Subject to any disclaimer, the term of this patent is extended or adjusted under 35 U.S.C. 154(b) by 0 days.

(21) Appl. No.: 15/491,858

(22) Filed: Apr. 19, 2017

(65) Prior Publication Data
US 2017/0221226 A1 Aug. 3, 2017

Related U.S. Application Data

(63) Continuation of application No. PCT/CN2014/090217, filed on Nov. 4, 2014.

(51) Int. Cl.
G06T 19/00 (2011.01)
G06T 7/80 (2017.01)

(52) U.S. Cl.
CPC ...... *G06T 7/80* (2017.01); *G06T 2207/10004* (2013.01); *G06T 2207/10016* (2013.01);
(Continued)

(58) Field of Classification Search
CPC .................................................. H04N 17/002
(Continued)

(56) References Cited

U.S. PATENT DOCUMENTS 6,757,445 B1 * 6/2004 Knopp ............... G01C 11/06
382/154
7,623,274 B1 * 11/2009 Lefevere ............ H04N 1/00002
358/406

(Continued)

FOREIGN PATENT DOCUMENTS

CN 1719477 A 1/2006
CN 101563709 A 10/2009

(Continued)

OTHER PUBLICATIONS

Douterloigne, et al. Fully automatic and robust UAV camera calibration using chessboard patterns. Geoscience and Remote Sensing Symposium, 2009 IEEE International, IGARSS 2009. vol. 2. IEEE, 2009; II-551 to II-554.

(Continued)

Primary Examiner — Jefferey F Harold
Assistant Examiner — Sihar A Karwan
(74) Attorney, Agent, or Firm — Anova Law Group, PLLC

(57) ABSTRACT

Systems, methods, and devices for calibrating one or more imaging devices are provided. In one aspect, a method comprises: receiving, from each of the one or more imaging devices, a plurality of images of a calibration target comprising a plurality of features and one or more reference markers; determining a spatial relationship between the one or more reference markers in each image of the plurality of images and the one or more reference markers on the calibration target; formulating, based on the spatial relationship, a correspondence between image coordinates of features in each image of the plurality of images and global coordinates for corresponding features on the calibration target; and determining, based on the correspondence, calibration parameters for the one or more imaging devices.

26 Claims, 19 Drawing Sheets

(52) U.S. Cl.
CPC ............... *G06T 2207/10032* (2013.01); *G06T 2207/30181* (2013.01); *G06T 2207/30204* (2013.01); *G06T 2207/30208* (2013.01); *G06T 2207/30244* (2013.01)

(58) Field of Classification Search
USPC .......................... 348/188; 345/419; 358/474
See application file for complete search history.

(56) References Cited

U.S. PATENT DOCUMENTS

| | | | |
|---|---|---|---|
| 8,305,430 | B2 | 11/2012 | Oskiper et al. |
| 8,743,214 | B2 | 6/2014 | Grossmann et al. |
| 2004/0257441 | A1 | 12/2004 | Pevear et al. |
| 2010/0172542 | A1 | 7/2010 | Stein et al. |
| 2011/0115922 | A1 | 5/2011 | Shimizu |
| 2011/0148866 | A1* | 6/2011 | Chu .................... G06T 15/04 345/419 |
| 2013/0208098 | A1 | 8/2013 | Pujol et al. |
| 2014/0253738 | A1 | 9/2014 | Mullis |

FOREIGN PATENT DOCUMENTS

| | | |
|---|---|---|
| CN | 103686143 A | 3/2014 |
| JP | 2005250994 A | 9/2005 |
| JP | 2005295495 A | 10/2005 |
| JP | 2006173999 A | 6/2006 |
| JP | 2008046687 A | 2/2008 |
| JP | 2009527150 A | 7/2009 |
| JP | 2010513907 A | 4/2010 |

OTHER PUBLICATIONS

European search report and search opinion dated Jul. 13, 2017 for EP Application No. 14905290.4.
European search report dated Mar. 29, 2017 for EP Application No. 14905290.4.
Fusiello. A compact algorithm for rectification of stereo pairs. Machine Vision and Applications. 2000; 12:16-22.
International search report and written opinion dated Jul. 27, 2015 for PCT/CN2014/090217.
Ma, Yi, ed. An invitation to 3-d vision: from images to geometric models. vol. 26. springer, 2004. Chapter 5, pp. 109-170.
OpenCV. Camera Calibration and 3D Reconstruction. Updated Apr. 21, 2014. http://docs.opencv.org/modules/calib3d/doc/camera_calibration_and_3d_reconstruction.html.
OPI. Calibration of a stereoscopic vision sensor. http://www.optique-ingenieur.org/en/courses/OPI_ang_M04_C01/co/Contenu94.html. 2014.
OPI.Calibration of a camera. http://www.optique-ingenieur.org/en/courses/OPI_ang_M04_C01/co/Contenu08.html. 2014.
Weng, et al. Camera calibration with distortion models and accuracy evaluation. IEEE Transactions on Pattern Analysis and Machine Intelligence. Oct. 1992; 14(10):965-980.
Zhang. "A flexible new technique for camera calibration," IEEE Transactions on Pattern Analysis and Machine Intelligence, 22(11):1330-1334, 2000.
Zhang. "Camera Calibration", in G. Medioni and S.B. Kang, eds., Emerging Topics in Computer Vision, Chapter 2, pp. 5-43, Prentice Hall Professional Technical Reference, 2004.
Taro Suzuki et al., Development of Information Collecting System Using a Small Unmanned Aerial Vehicle for Disaster Prevention and Mitigation, Journal of the Robotics Society of Japan, Sep. 3, 2008, pp. 85-92.

* cited by examiner

CAMERA CALIBRATION

CROSS-REFERENCE

This application is a continuation of International Application No. PCT/CN2014/090217, filed on Nov. 4, 2014. The above-referenced applications are hereby incorporated by reference.

BACKGROUND

Unmanned vehicles such as unmanned aerial vehicles (UAVs) can be used to perform surveillance, reconnaissance, and exploration tasks for a wide variety of military and civilian applications. In some instances, a UAV can carry a camera for generating image data of objects in an environment. Based on the specific application, a camera calibration procedure can be performed in order to determine one or more parameters of the camera.

Existing approaches for camera calibration may not be optimal in some instances. For example, some camera calibration methods may not be optimal for calibrating imaging systems with multiple cameras.

SUMMARY

The present disclosure provides systems, methods, and devices for improved calibration of cameras and other types of imaging devices. In some embodiments, the calibration techniques described herein utilize images obtained by one or more imaging devices of a calibration target comprising a plurality of features and one or more uniquely identifiable reference markers. The reference markers can be used to facilitate determination of a correspondence between image coordinates of features in the images and the global coordinates of corresponding features on the calibration target. Based on the determined correspondence, one or more calibration parameters (e.g., extrinsic and/or intrinsic parameters) for the imaging devices can be calculated. Some aspects of the present disclosure permit determination of calibration parameters using images that depict less than the entirety of the calibration target (e.g., less than all of the features on the calibration target). Advantageously, this approach provides improved accuracy and flexibility of the calibration process, particularly with respect to calibration of multiple imaging devices.

Thus, in one aspect, a method for calibrating one or more imaging devices is provided. The method comprises: receiving, from each of the one or more imaging devices, a plurality of images of a calibration target, the calibration target comprising a plurality of features arranged in a repeating pattern and one or more reference markers, wherein the one or more reference markers are each uniquely identifiable in each image of the plurality of images, and wherein the plurality of images comprises at least one image capturing less than all of the plurality of features; determining, with aid of one or more processors, a spatial relationship between the one or more reference markers in each image of the plurality of images and the one or more reference markers on the calibration target; formulating, based on the spatial relationship and with aid of one or more processors, a correspondence between image coordinates of features in each image of the plurality of images and global coordinates for corresponding features on the calibration target; and determining, based on the correspondence and with aid of the one or more processors, calibration parameters for the one or more imaging devices.

In some embodiments, the one or more imaging devices are carried by an unmanned aerial vehicle.

In some embodiments, said each image of the plurality of images captures the one or more reference markers and at least a subset of the plurality of features on the calibration target. The plurality of images from each of the one or more imaging devices can be taken at different positions and orientations relative to the calibration target.

In some embodiments, the calibration target is a checkerboard comprising a plurality of squares and the plurality of features comprises corner points of the plurality of squares. The one or more reference markers can each be positioned within one of the plurality of squares. The plurality of features can comprise four outer corners of the checkerboard and the at least one image can omit at least one of the four outer corners.

In some embodiments, the one or more reference markers comprise at least three reference markers. The one or more reference markers can comprise circular dots, triangles, or quadrilaterals. The one or more reference markers can be overlaid onto the repeating pattern. The one or more reference markers can form vertices of an irregular polygon on the calibration target. The one or more reference markers can comprise three reference markers forming vertices of an isosceles or scalene triangle.

In some embodiments, the one or more reference markers form vertices of an irregular polygon in the plurality of images, and the step of determining the spatial relationship comprises identifying a correspondence between the vertices of the irregular polygon in the plurality of images and the vertices of the irregular polygon on the calibration target. The plurality of features can be arranged in the repeating pattern over a plane and the one or more reference markers can form a shape that is rotationally asymmetric within the plane.

In some embodiments, the one or more imaging devices comprise a first camera and a second camera that capture images at substantially the same time. The formulating step can comprise identifying features present in both an image obtained by the first camera and a corresponding image obtained by the second camera. The calibration parameters can comprise at least one of a focal length, a position of the principal point, pixel size, or optical distortion for each of the one or more imaging devices. The calibration parameters can comprise a position and an orientation of each of the one or more imaging devices relative to the calibration target.

In another aspect, a system for calibrating one or more imaging devices is provided. The system comprises: one or more imaging devices each configured to capture a plurality of images of a calibration target, the calibration target comprising a plurality of features arranged in a repeating pattern and one or more reference markers, wherein the one or more reference markers are each uniquely identifiable in each image of the plurality of images, and wherein the plurality of images comprises at least one image capturing less than all of the plurality of features; and one or more processors that are collectively or individually configured to: receive the plurality of images from each of the one or more imaging devices; determine a spatial a spatial relationship between the one or more reference markers in each image of the plurality of images and the one or more reference markers on the calibration target; formulate a correspondence between image coordinates of features in each image of the plurality of images and global coordinates for corresponding features on the calibration target based on the predetermined global coordinates of the one or more reference markers; and determine calibration parameters for the one or more imaging devices based on the correspondence.

In some embodiments, the one or more imaging devices are carried by an unmanned aerial vehicle.

In some embodiments, said each image of the plurality of images captures the one or more reference markers and at least a subset of the plurality of features on the calibration target. The plurality of images from each of the one or more imaging devices can be taken at different positions and orientations relative to the calibration target.

In some embodiments, the calibration target is a checkerboard comprising a plurality of squares and the plurality of features comprises corner points of the plurality of squares. The one or more reference markers can each be positioned within one of the plurality of squares. The plurality of features can comprise four outer corners of the checkerboard and the at least one image can omit at least one of the four outer corners.

In some embodiments, the one or more reference markers comprise at least three reference markers. The one or more reference markers can comprise circular dots, triangles, or quadrilaterals. The one or more reference markers can be overlaid onto the repeating pattern. The one or more reference markers can form vertices of an irregular polygon on the calibration target. The one or more reference markers can comprise three reference markers forming vertices of an isosceles or scalene triangle.

In some embodiments, the one or more reference markers form vertices of an irregular polygon in the plurality of images, and the step of determining the spatial relationship comprises identifying a correspondence between the vertices of the irregular polygon in the plurality of images and the vertices of the irregular polygon on the calibration target. The plurality of features can be arranged in the repeating pattern over a plane and the one or more reference markers can form a shape that is rotationally asymmetric within the plane.

In some embodiments, the one or more imaging devices comprise a first camera and a second camera that capture images at substantially the same time. The formulating step can comprise identifying features present in both an image obtained by the first camera and a corresponding image obtained by the second camera. The calibration parameters can comprise at least one of a focal length, a position of the principal point, pixel size, or optical distortion for each of the one or more imaging devices. The calibration parameters can comprise a position and an orientation of each of the one or more imaging devices relative to the calibration target.

In another aspect, a method for generating depth maps using one or more imaging devices is provided. The method comprises: obtaining one or more images from each the one or more imaging devices; and processing, with aid of one or more processors, the one or more images from each of the one or more imaging devices based on calibration parameters for the one or more imaging devices so as to generate a three-dimensional depth map, wherein the calibration parameters are determined using a plurality of calibration images of a calibration target from each of the one or more imaging devices, the calibration target comprising a plurality of features arranged in a repeating pattern and one or more reference markers, wherein the one or more reference markers are each uniquely identifiable within each calibration image of the plurality of calibration images, and wherein the plurality of calibration images comprises at least one calibration image capturing less than all of the plurality of features.

In some embodiments, the one or more imaging devices are carried by an unmanned aerial vehicle. The depth map can comprise information indicating distances of one or more objects from the unmanned aerial vehicle.

In some embodiments, said each calibration image of the plurality of calibration captures the one or more reference markers and at least a subset of the plurality of features on the calibration target. The plurality of calibration images from each of the imaging devices can be taken at different positions and orientations relative to the calibration target.

In some embodiments, the calibration target is a checkerboard comprising a plurality of squares and the plurality of features comprises corner points of the plurality of squares. The one or more reference markers can each be positioned within one of the plurality of squares. The plurality of features can comprise four outer corners of the checkerboard and the at least one calibration image can omit at least one of the four outer corners.

In some embodiments, the one or more reference markers comprise at least three reference markers. The one or more reference markers can comprise circular dots, triangles, or quadrilaterals. The one or more reference markers can be overlaid onto the repeating pattern. The one or more reference markers can form vertices of an irregular polygon on the calibration target. The one or more reference markers can comprise three reference markers forming vertices of an isosceles or scalene triangle.

In some embodiments, the one or more reference markers form vertices of an irregular polygon in the plurality of images, and the calibration parameters are determined by at least identifying a correspondence between the vertices of the irregular polygon in the plurality of calibration images and the vertices of the irregular polygon on the calibration target. The plurality of features can be arranged in the repeating pattern over a plane and the one or more reference markers can form a shape that is rotationally asymmetric within the plane.

In some embodiments, the one or more reference markers form vertices of an irregular polygon in the plurality of images, and the step of determining the spatial relationship comprises identifying a correspondence between the vertices of the irregular polygon in the plurality of images and the vertices of the irregular polygon on the calibration target. The plurality of features can be arranged in the repeating pattern over a plane and the one or more reference markers can form a shape that is rotationally asymmetric within the plane.

In some embodiments, the one or more imaging devices comprise a first camera and a second camera that capture images at substantially the same time. Processing the one or more images can comprise identifying features present in both an image obtained by the first camera and a corresponding image obtained by the second camera. Processing the one or more images can comprise determining a disparity between an image captured by the first camera and a corresponding image captured by the second camera. The calibration parameters can comprise at least one of a focal length, a position of the principal point, pixel size, or optical distortion for each of the one or more imaging devices. The calibration parameters can comprise a position and an orientation of each of the one or more imaging devices relative to the calibration target. Processing the one or more images can comprise reducing optical distortion in at least one of the one or more images.

In another aspect, a system for generating depth maps using one or more imaging devices is provided. The system can comprise: one or more imaging devices each configured to obtain images; and one or more processors that are collectively or individually configured to: obtain, from each the one or more imaging devices, one or more images; and process the one or more images from each of the one or more imaging devices based on calibration parameters for the one or more imaging devices so as to generate a three-dimensional depth map, wherein the calibration parameters are determined using a plurality of calibration images of a calibration target from each of the one or more imaging devices, the calibration target comprising a plurality of features arranged in a repeating pattern and one or more reference markers, wherein the one or more reference markers are each uniquely identifiable within each calibration image of the plurality of calibration images, and wherein the plurality of calibration images comprises at least one calibration image capturing less than all of the plurality of features.

In some embodiments, the one or more imaging devices are carried by an unmanned aerial vehicle. The depth map can comprise information indicating distances of one or more objects from the unmanned aerial vehicle.

In some embodiments, said each calibration image of the plurality of calibration captures the one or more reference markers and at least a subset of the plurality of features on the calibration target. The plurality of calibration images from each of the imaging devices can be taken at different positions and orientations relative to the calibration target.

In some embodiments, the calibration target is a checkerboard comprising a plurality of squares and the plurality of features comprises corner points of the plurality of squares. The one or more reference markers can each be positioned within one of the plurality of squares. The plurality of features can comprise four outer corners of the checkerboard and the at least one calibration image can omit at least one of the four outer corners.

In some embodiments, the one or more reference markers comprise at least three reference markers. The one or more reference markers can comprise circular dots, triangles, or quadrilaterals. The one or more reference markers can be overlaid onto the repeating pattern. The one or more reference markers can form vertices of an irregular polygon on the calibration target. The one or more reference markers can comprise three reference markers forming vertices of an isosceles or scalene triangle.

In some embodiments, the one or more reference markers form vertices of an irregular polygon in the plurality of images, and the calibration parameters are determined by at least identifying a correspondence between the vertices of the irregular polygon in the plurality of calibration images and the vertices of the irregular polygon on the calibration target. The plurality of features can be arranged in the repeating pattern over a plane and the one or more reference markers can form a shape that is rotationally asymmetric within the plane.

In some embodiments, the one or more reference markers form vertices of an irregular polygon in the plurality of images, and the step of determining the spatial relationship comprises identifying a correspondence between the vertices of the irregular polygon in the plurality of images and the vertices of the irregular polygon on the calibration target. The plurality of features can be arranged in the repeating pattern over a plane and the one or more reference markers can form a shape that is rotationally asymmetric within the plane.

In some embodiments, the one or more imaging devices comprise a first camera and a second camera that capture images at substantially the same time. Processing the one or more images can comprise identifying features present in both an image obtained by the first camera and a corresponding image obtained by the second camera. Processing the one or more images can comprise determining a disparity between an image captured by the first camera and a corresponding image captured by the second camera. The calibration parameters can comprise at least one of a focal length, a position of the principal point, pixel size, or optical distortion for each of the one or more imaging devices. The calibration parameters can comprise a position and an orientation of each of the one or more imaging devices relative to the calibration target. Processing the one or more images can comprise reducing optical distortion in at least one of the one or more images.

It shall be understood that different aspects of the invention can be appreciated individually, collectively, or in combination with each other. Various aspects of the invention described herein may be applied to any of the particular applications set forth below or for any other types of movable objects. Any description herein of an aerial vehicle may apply to and be used for any movable object, such as any vehicle. Additionally, the systems, devices, and methods disclosed herein in the context of aerial motion (e.g., flight) may also be applied in the context of other types of motion, such as movement on the ground or on water, underwater motion, or motion in space. Furthermore, any description herein of a rotor or rotor assembly may apply to and be used for any propulsion system, device, or mechanism configured to generate a propulsive force by rotation (e.g., propellers, wheels, axles).

Other objects and features of the present invention will become apparent by a review of the specification, claims, and appended figures.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION

Figure 1:
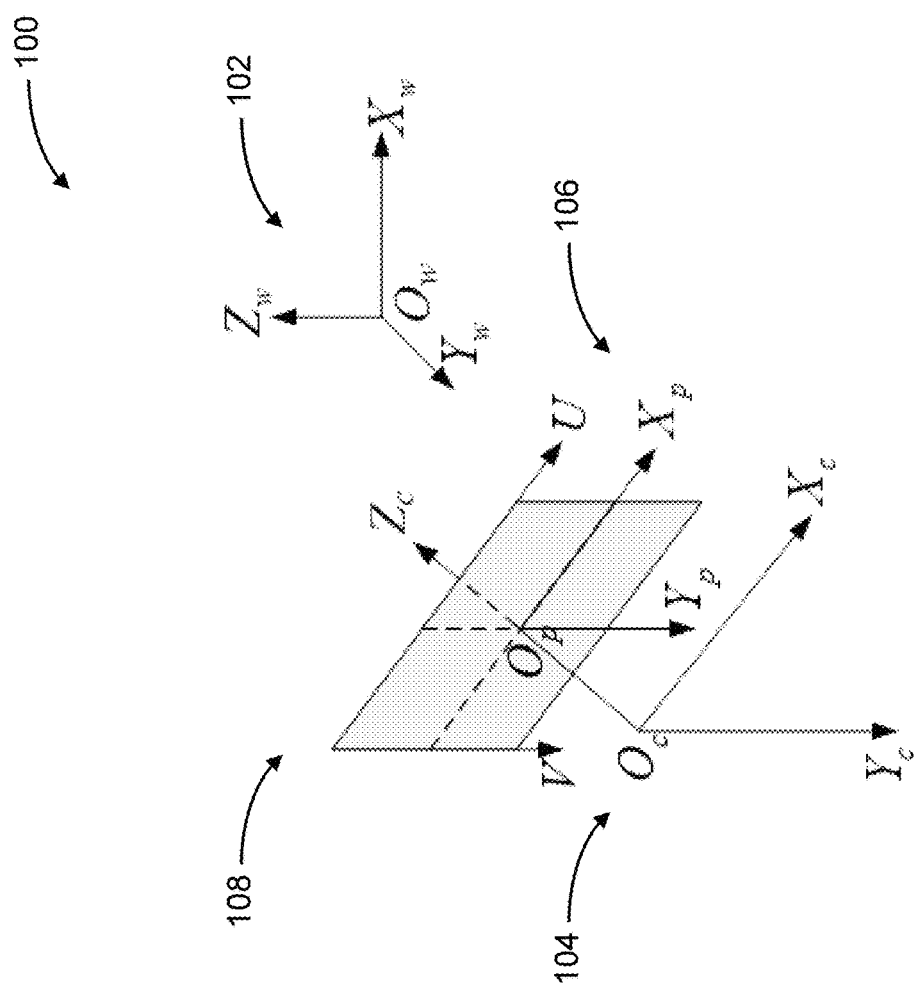
FIG. 1 illustrates a model of a monocular camera, in accordance with embodiments.

The present disclosure provides improved systems, methods, and devices for performing calibration of imaging devices such as cameras. The approaches described herein can involve using one or more imaging devices to obtain a plurality of images of a calibration target. The calibration target can include a plurality of features and one or more reference markers. The one or more reference markers can be uniquely identifiable so as to facilitate determination of the correspondence between image coordinates of the features in the images and world coordinates of the features on the calibration target, even when some of the images do not capture all of the features of the calibration target. This approach may be advantageous for providing accurate and reliable calibration even in situations where it is difficult for each of the imaging devices to obtain image data of the entirety of the calibration target, e.g., when multiple imaging devices are being simultaneously calibrated. Additionally, such approaches permit the use of larger calibration targets, which can improve the accuracy of the resultant calibration parameters.

The techniques described herein can be implemented for use in a wide variety of applications involving imaging and imaging data, such as vision-based navigation using one or more imaging devices carried by a movable object. As an example, the systems, methods, and devices of the present disclosure can be used to calibrate one or more cameras carried by an unmanned aerial vehicle (UAV). Each of the one or more cameras can be used to capture a plurality of images of a checkerboard calibration target having at least three circular reference markers overlaid onto the squares of the checkerboard. The reference markers can be uniquely identifiable in the images so as to facilitate the determination of the world coordinates of the corner points of the checkerboard corresponding to the corner points captured in the image data. This correspondence information can be used to determine calibration parameters for the UAV cameras.

Subsequent image data captured by the cameras can be processed based on the calibration parameters, e.g., in order to generate three-dimensional (3D) depth maps of the surrounding environment and/or objects within the environment.

The techniques described herein can be used to calibrate one or more imaging devices (e.g., cameras, scanners, etc). An imaging device, which may also be referred to herein as a "vision sensor," can be configured to detect electromagnetic radiation (e.g., visible, infrared, and/or ultraviolet light) and generate image data based on the detected electromagnetic radiation. For example, an imaging device may include a charge-coupled device (CCD) sensor or a complementary metal-oxide-semiconductor (CMOS) sensor that generates electrical signals in response to wavelengths of light. The resultant electrical signals can be processed to produce image data. The image data generated by an imaging device can include one or more images, which may be static images (e.g., photographs), dynamic images (e.g., video), or suitable combinations thereof. The image data can be polychromatic (e.g., RGB, CMYK, HSV) or monochromatic (e.g., grayscale, black-and-white, sepia).

The imaging devices of the present disclosure can be carried by various types of objects, such as by one or more of the movable objects described herein. An imaging device can be situated on any suitable portion of the object, such as above, underneath, on the side(s) of, or within the object. Some imaging devices can be mechanically coupled to the object such that the spatial disposition and/or motion of the object correspond to the spatial disposition and/or motion of the imaging devices. The imaging device can be coupled to the object via a rigid coupling, such that the imaging device does not move relative to the portion of the object to which it is attached. Alternatively, the coupling between the imaging device and the object can permit movement of the imaging device relative to the object. The coupling can be a permanent coupling or non-permanent (e.g., releasable) coupling. Suitable coupling methods can include adhesives, bonding, welding, and/or fasteners (e.g., screws, nails, pins, etc.). Optionally, the imaging device can be integrally formed with a portion of the object. Furthermore, the imaging device can be electrically coupled with a portion of the object (e.g., processing unit, control system, data storage) so as to enable the data collected by the imaging device to be used for various functions of the object (e.g., navigation, control, propulsion, communication with a user or other device, etc.), such as the embodiments discussed herein.

In some embodiments, the imaging devices are carried by a UAV. For example, the UAV may be a small-scale UAV (e.g., weighing no more than 10 kg, having a maximum dimension of no more than 1.5 m). The UAV can be a rotorcraft, such as a multi-rotor aircraft that is propelled to move through the air by a plurality of propellers (e.g., a quadcopter). The UAVs described herein can be operated completely autonomously (e.g., by a suitable computing system such as an onboard controller), semi-autonomously, or manually (e.g., by a human user). The UAV can receive commands from a suitable entity (e.g., human user or autonomous control system) and respond to such commands by performing one or more actions. For example, the UAV can be controlled to take off from the ground, move within the air (e.g., with up to three degrees of freedom in translation and up to three degrees of freedom in rotation), move to target location or to a sequence of target locations, hover within the air, land on the ground, and so on. As another example, the UAV can be controlled to move at a specified velocity and/or acceleration (e.g., with up to three degrees of freedom in translation and up to three degrees of freedom in rotation) or along a specified movement path. Furthermore, the commands can be used to control one or more UAV components, such as the components described herein (e.g., sensors, actuators, propulsion units, payload, etc.).

In some embodiments, the imaging device can be a camera. Although certain embodiments provided herein are described in the context of cameras, it shall be understood that the present disclosure can be applied to any suitable imaging device, and any description herein relating to cameras can also be applied to other types of imaging devices. A camera can be used to generate 2D images of a 3D scene (e.g., an environment, one or more objects, etc.). The images generated by the camera can represent the projection of the 3D scene onto a 2D image plane. Accordingly, each point in the 2D image corresponds to a 3D spatial coordinate in the scene.

FIG. 1 illustrates a model 100 of a single camera (monocular camera), in accordance with embodiments. The model 100 includes a world coordinate system 102, a camera coordinate system 104, an image plane coordinate system 106, and a pixel coordinate system 108. The world coordinate system 102, which may also be referred to herein as a "global coordinate system," represents the reference frame of the scene captured by the camera and/or the environment in which the camera is operating. The world coordinate system 102 has a coordinate origin $O_w$ and 3D coordinate axes $X_w$, $Y_w$, $Z_w$. In some embodiments, the world coordinate system 102 can be defined with respect to an object of interest in the scene, such as a calibration target, as described in further detail below. The camera coordinate system 104 represents the reference frame of the camera and has a coordinate origin $O_c$ and 3D coordinate axes $X_c$, $Y_c$, $Z_c$. The axis $Z_c$ can correspond to the optical axis of the camera, with the outward direction being the positive direction.

The image plane coordinate system 106 and pixel coordinate system 108, which may also be referred to herein as "image coordinate systems," represent the reference frame of the image generated by the camera. The image plane coordinate system has a coordinate origin $O_p$ and 2D coordinate axes $X_p$, $Y_p$. The locations of the pixels within the image can be represented in terms of a pixel coordinate system 108 having a coordinate origin at the upper left corner of the image and 2D coordinate axes u, v. The u axis can be parallel to the image rows with the right direction being the positive direction, while the v axis can be parallel to the image columns with the down direction being the positive direction. In some embodiments, the camera coordinate system 104 is aligned with the image plane coordinate system 106 and pixel coordinate system 108. For instance, the $X_c$ axis of the camera coordinate system 104 can be parallel to the image rows and be aligned in the same direction as the u axis of the pixel coordinate system 108. Similarly, the $Y_c$ axis of the camera coordinate system 104 can be parallel to the image columns and be aligned in the same direction as the v axis of the pixel coordinate system 108.

Although FIG. 1 depicts a single imaging device, it shall be understood that the embodiments described herein can be applied to any suitable number of imaging devices, such as one, two, three, four, five, or more imaging devices. The imaging devices may all be of the same type. Alternatively, at least some of the imaging devices may be of different types. The imaging devices can be positioned and oriented relative to each other as desired. For example, various embodiments provided herein utilize two imaging devices (binocular vision), e.g., a left camera and a right camera. The imaging devices can be situated at different positions and orientations such that the field of view of each imaging device is different. The fields of view of the imaging devices may overlap. In some embodiments, the imaging devices each provide image data of the same scene from different positions and/or orientations. The imaging devices can be configured to capture images of a scene at the same time or approximately the same time. Alternatively, some imaging devices can be configured to capture images at different times than other imaging devices.

In some embodiments, it may be desirable obtain 3D information of a scene using 2D image data of the scene collected by one or more imaging devices. For example, various applications may involve generating a 3D reconstruction (e.g., a 3D model such as a point cloud, occupancy grid, depth map, disparity map, etc.) of a scene based on a plurality of 2D images of the scene (e.g., images taken at a plurality of different positions and orientations). In embodiments where a plurality of imaging devices are used, the 3D reconstruction can be generated based on disparities between image data obtained by imaging devices situated at different positions and/or orientations, as described in greater detail below. Alternatively or in combination, 3D information can also be recovered from image data obtained from a single imaging device, e.g., using structure-from-motion or other suitable techniques. The resultant 3D reconstruction can be used to determine various types of quantitative information regarding the scene, e.g., spatial positions of objects (e.g., distance from the camera, other objects), object dimensions (e.g., length, width, height). This information can be useful in a wide variety of applications, e.g., computer vision, object recognition, tracking, pose estimation, egomotion determination, etc. For instance, in the context of UAV operation, scene reconstruction can be helpful for functionalities such as navigation, obstacle avoidance, mapping, target tracking, and the like.

In some embodiments, the scene reconstruction techniques described herein involve determining the correspondence between the image coordinates in an image of a scene and the world coordinates (also known as global coordinates) of the actual scene. This correspondence can be identified by determining the conversions or mappings between the various coordinate systems, e.g., the world coordinate system, camera coordinate system, and image coordinate system. The mathematical relationships defining these mappings can be determined based on models of the scene, imaging devices, and image plane, e.g., a pinhole camera model.

Figure 2:
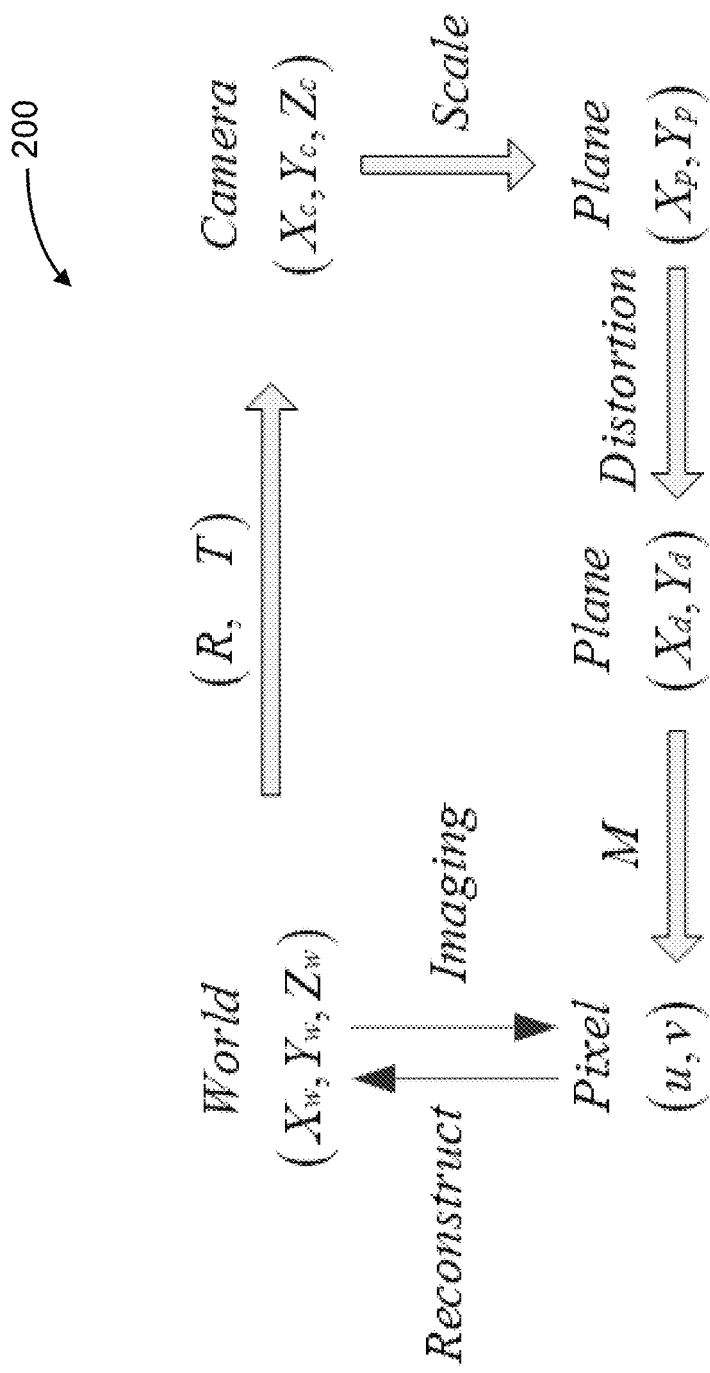
FIG. 2 illustrates a model of a mapping from a world coordinate system to an image coordinate system, in accordance with embodiments.

FIG. 2 illustrates a model 200 of a mapping from a world coordinate system to an image coordinate system, in accordance with embodiments. The mapping model 200 depicts the relationships between the world, camera, and image coordinate systems. The mapping model 200 can be used to describe the imaging process (e.g., projecting world coordinates of an object in a scene to image coordinates in an image) and the reconstruction process (e.g., using image coordinates in an image to recover the world coordinates of an object in a scene).

The world coordinate system can be related to the camera coordinate system by the equation $$\begin{bmatrix} X_c \\ Y_c \\ Z_c \end{bmatrix} = R \cdot \begin{bmatrix} X_w \\ Y_w \\ Z_w \end{bmatrix} + T \quad (1)$$

where R is the rotation matrix and T is the translation vector indicating how the camera coordinate system is oriented and positioned relative to the world coordinate system, respectively. The camera coordinates can be scaled in order to obtain the corresponding image plane coordinates:

$$\begin{cases} X_p = X_c/Z_c \\ Y_p = Y_c/Z_c \end{cases} \quad (2)$$

In embodiments where the camera has optical lens distortion (e.g., radial distortion, eccentric distortion, thin prism distortion), the image plane coordinates with distortion $X_d$, $Y_d$ can be determined from the image plane coordinates using techniques known to those of skill in the art, such as from the following distortion equation:

$$\begin{cases} X_d = X_p(1 + k_1 r^2 + k_2 r^4 + k_3 r^6 + \dots) + \\ \quad 2p_1 X_p Y_p + p_2(r^2 + 2X_p^2) + s_1 r^2 \\ Y_d = Y_c(1 + k_1 r^2 + k_2 r^4 + k_3 r^6 + \dots) + \\ \quad p_1(r^2 + 2Y_p^2) + 2p_2 X_p Y_p + s_2 r^2 \end{cases} \quad (3)$$

where $r = \sqrt{X_p^2 + Y_p^2}$ and $k_1$, $k_2$, $k_3$, $p_1$, $p_2$, $s_1$, $s_2$ are the distortion parameters ($k_1$, $k_2$, $k_3$ being the radial distortion parameters, $p_1$, $p_2$ being the eccentric distortion parameters, and $s_1$, $s_2$ being the thin prism distortion parameters. In some embodiments, only four of the parameters (e.g., $k_1$, $k_2$, $p_1$, $p_2$) are calculated.

The pixel coordinates can be obtained using the following relationship:

$$\begin{bmatrix} u \\ v \\ 1 \end{bmatrix} = M \cdot \begin{bmatrix} X_d \\ Y_d \\ 1 \end{bmatrix} = \begin{bmatrix} f_x & 0 & u_0 \\ 0 & f_y & v_0 \\ 0 & 0 & 1 \end{bmatrix} \begin{bmatrix} X_d \\ Y_d \\ 1 \end{bmatrix} \quad (4)$$

where M is the camera intrinsic matrix, $u_0$, $v_o$ are the coordinates of the principal point (where the optical axis intersects with the image plane, also known as the image center), and $$\begin{cases} f_x = f/a_x \\ f_y = f/a_y \end{cases},$$

with f being the focal length of the camera, and $a_x$, $a_y$ are the horizontal and vertical pixel dimensions, respectively.

Figure 3:
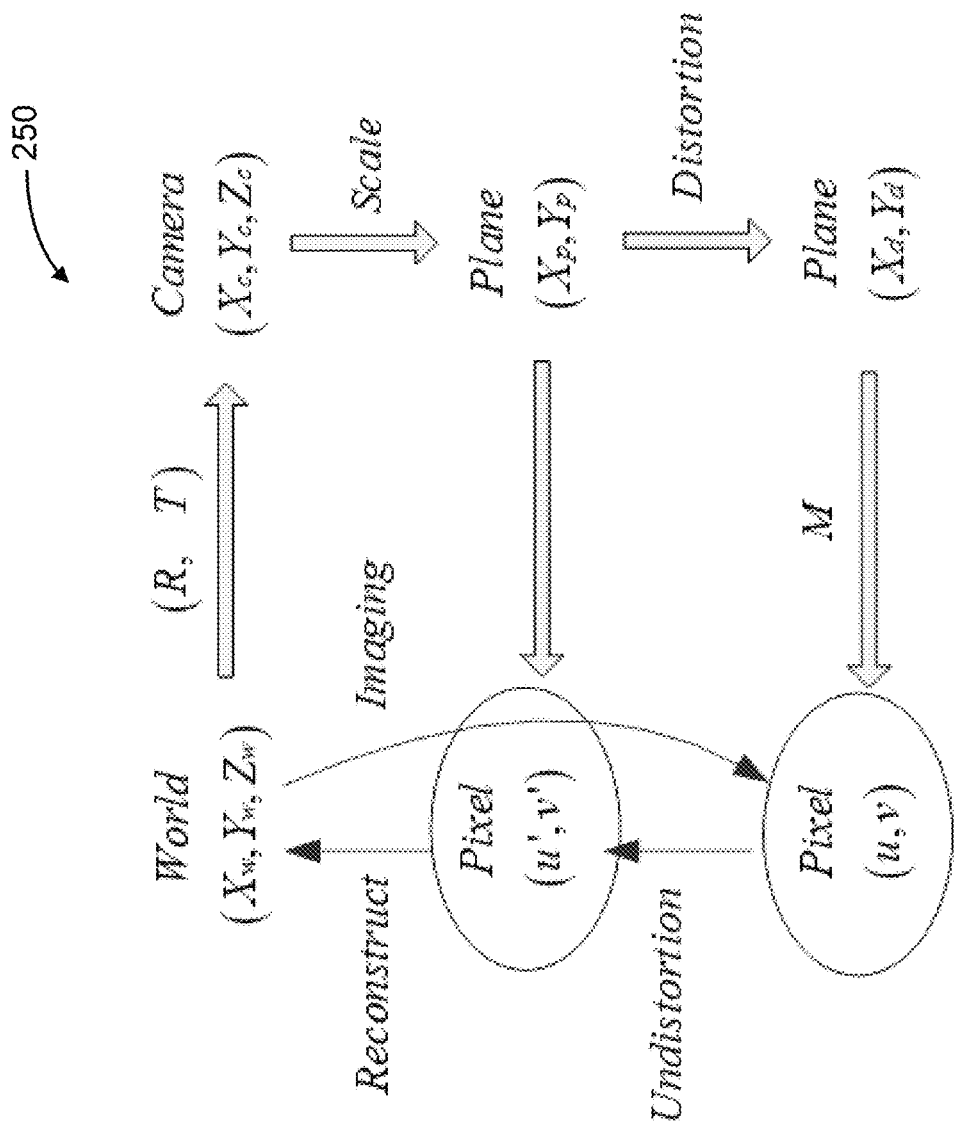
FIG. 3 illustrates a model of a mapping from a world coordinate system to an image coordinate system, in accordance with embodiments.

FIG. 3 illustrates a model 250 of a mapping from a world coordinate system to an image coordinate system, in accordance with embodiments. The relationships between the world coordinate system, camera coordinate system, undistorted image plane coordinate system, distorted image plane coordinate system, and pixel coordinate system can be similar to those described herein with respect to the mapping model 200 of FIG. 2. Similar to the mapping model 200, the mapping model 250 can be used to describe the imaging process (e.g., projecting world coordinates $(X_w, Y_w, Z_w)$ to pixel coordinates (u, v)). The world coordinates of an object can be recovered from the pixel coordinates by undistorting the image so as to obtain undistorted pixel coordinates (u', v') and then reconstructing the world coordinates using the undistorted pixel coordinates.

In order to accurately perform scene reconstruction from image data, it may be beneficial to determine or estimate one or more parameters of the imaging devices that are associated with the mappings described herein. These parameters can include extrinsic parameters (the rotation matrix R and the translation vector T that indicate how each imaging devices is positioned and oriented relative to the calibration target) and intrinsic parameters (the intrinsic matrix M which includes information regarding the focal length, position of the principal point, pixel size; optical distortion parameters $k_1$, $k_2$, $k_3$, $p_1$, $p_2$, $s_1$, $s_2$). In embodiments where a plurality of imaging devices are used, the extrinsic parameters can also include the rotation matrices and translation vectors for converting between the camera coordinate systems of the imaging devices that indicate how the imaging devices are positioned and oriented relative to each other, as described in further detail below. The process of obtaining the extrinsic and/or intrinsic parameters of one or more imaging devices may be referred to herein as "camera calibration."

Camera calibration can be particularly useful when the imaging devices are mounted or carried by a movable object, such as a UAV. The operation of such movable objects can cause changes in the position and/or orientation of the imaging devices, e.g., due to vibrations and other motions, which can influence the calibration parameters. Calibration of imaging devices carried by a movable object can occur while the movable object is operating (online calibration) and/or while the movable object is not operating (offline calibration). For example, offline calibration for cameras carried by a UAV can be performed when the UAV is turned off and/or not in flight, while online calibration for can be performed while the UAV is turned on and/or in flight.

Camera calibration can be performed in a variety of ways. In some embodiments, the calibration process involves obtaining images of a scene having a plurality of features, then identifying correspondences between image coordinates of the features in the images and the world coordinates of the corresponding features in the scene. The calibration parameters can then be estimated based on the identified correspondences and the mapping between the world and image coordinate systems (e.g., defined based on the mapping models described herein). For example, monocular calibration (determining the parameters of a single camera) can involve generating an estimate of the calibration parameters (e.g., R, T, M) based on a pinhole camera model, then estimating the effect of distortion (e.g., initial values of distortion parameters are assumed to be 0), then performing a parameter optimization (e.g., using the Levenberg-Marquardt algorithm) in order to obtain the optimal camera calibration parameters.

In some embodiments, a calibration target is used to facilitate the identification of world-image coordinate correspondences. A calibration target can be any structure having a defined arrangement of features. For example, the calibration target may be 1D (e.g., a linear, curved, or curvilinear shape), 2D (e.g., a plane or other flat surface), or 3D (e.g., a cube, sphere, prism, two or more intersecting planes). The features can be designed so as to be easily identifiable from image data (e.g., using image recognition algorithms, feature extraction algorithms, or other computer vision techniques) and clearly distinguishable from non-features (e.g., other portions of the calibration target, other objects in the scene, image noise). In some embodiments, the features are points on the calibration target (e.g., corners, vertices, intersection points), also referred to herein as "feature points." Alternatively or in combination, the features can be lines (e.g., linear, curved, or curvilinear), edges (e.g., between two differently colored areas), geometric shapes (e.g., circles, triangles, quadrilaterals, etc.), symbols or characters (e.g., alphanumeric characters), or suitable combinations thereof. Additionally, the characteristics of each feature (e.g., size, shape, color) can be varied as desired.

The calibration target can include any suitable number and combination of features. For example, a calibration target can include at least 10, 20, 30, 40, 50, 60, 70, 80, 90, or 100 features. The use of a relatively large number of features may improve the accuracy of the calibration process. In some embodiments, a calibration target can include only one type of feature, while in other embodiments, the target can include more than one type of feature, such as at least two, three, four, five, or more different types of feature. The features can be situated on the calibration target at defined locations such that the position and/or orientation of each feature relative to the calibration target are known. In some embodiments, the features are arranged on the calibration target in a repeating pattern (e.g., a grid having a plurality of rows and columns) having predetermined dimensions (e.g., length, width, height, spacing between features). The features can be static features, such that their position and/or orientation on the calibration target do not change. Alternatively, the features can be dynamic features with varying positions and/or orientations. The features described herein can be integrally formed with the calibration target (e.g., printed or painted onto a portion of the target) or provided separately and coupled to the target (e.g., attached or affixed to a portion of the target).

In some embodiments, the calibration process involves capturing a set of images of the calibration target with each imaging device to be calibrated. Each image data set can include at least 5, 10, 15, 20, 25, 30, 35, 40, 45, 50, or more images of the calibration target. The images can depict the calibration target at a plurality of different positions and/or orientations. Each image can be processed in order to identify features present in the image and determine their image coordinates. The correspondences between image coordinates of the features in the image data and the world coordinates of the features on the calibration target can be determined and subsequently used to solve for the calibration parameters (e.g., based on the mathematical relationships described herein). Optionally, in embodiments where multiple imaging devices are used to obtain multiple sets of image data, the correspondences between image coordinates of features across the image data sets can also be determined and used to estimate the parameters for the multiple imaging devices (e.g., position and/orientation of the imaging devices relative to each other).

Figure 4:
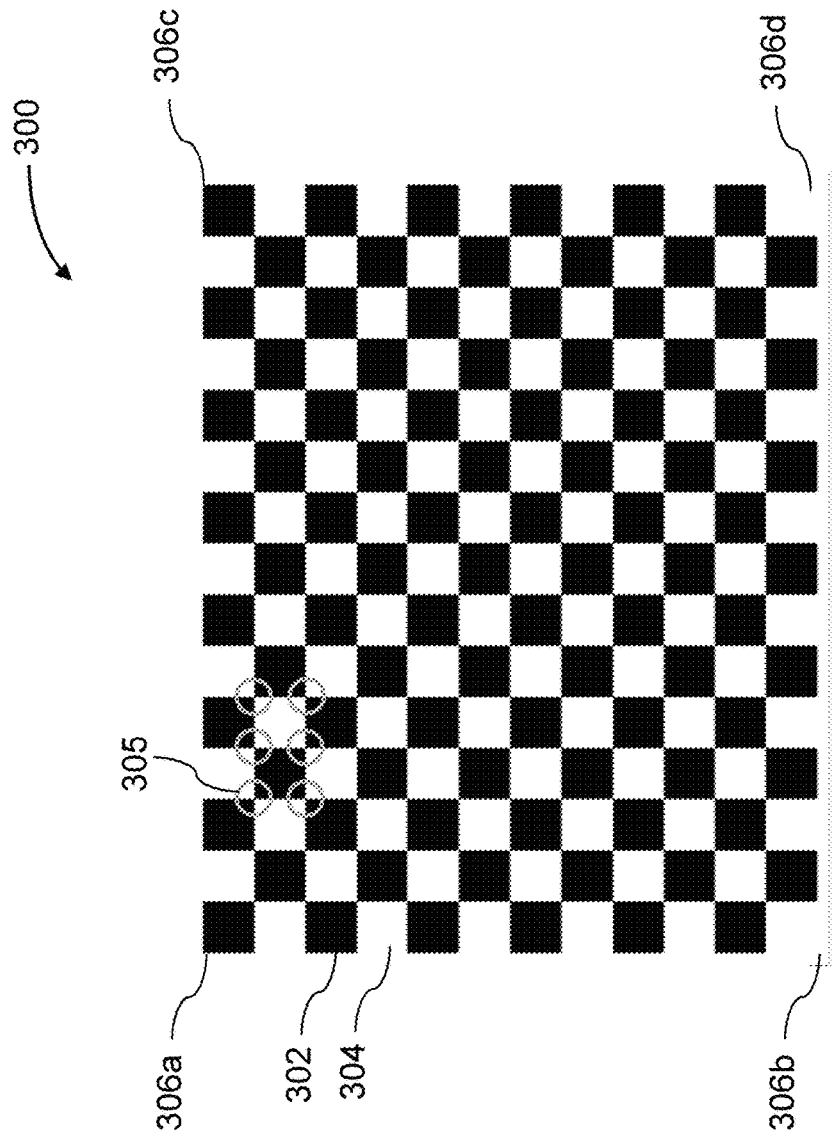
FIG. 4 illustrates a calibration target suitable for use in imaging device calibration, in accordance with embodiments.

FIG. 4 illustrates a calibration target 300 suitable for use in imaging device calibration, in accordance with embodiments. The target 300 comprises a planar checkerboard pattern having a repeating pattern of black squares 302 alternating with white squares 304. Each of the squares 302, 304 can be identically sized and arranged in a grid having a plurality of rows and columns. In some embodiments, the corner points of the squares (e.g., as indicated by circles 305) serve as the feature points of the calibration target 300 for performing image device calibration. Corner points may be relatively easy to distinguish from other portions of the image data using machine vision methods. Alternatively or in combination, other portions of the checkerboard can serve as the features of the target 300 for calibration purposes (e.g., the black squares 302, the white squares 304, etc.). The features of the target 300 can be identified from image data of the calibration target 300 using various feature extraction techniques, and the image coordinates of each feature determined. This process can be facilitated by knowledge of the geometry of calibration target 300. For example, in embodiments where the corner points of the checkerboard squares 302, 304 serve as the feature points of the calibration target 300, the size of the squares defines the spacing between neighboring feature points. The image coordinates of each corner point can thus be determined based on its row and column position within the checkerboard.

Once the image coordinates of the features in the image data of the target 300 have been determined, the correspondence between the image coordinates and the world coordinates of the features on the target 300 can then be identified. The world coordinate system can be defined relative to the target 300, such that the world coordinates of each feature correspond to the position of the feature on the target 300. For example, the origin $O_w$ of the world coordinate system can be positioned at one of the four outer corners (306a, 306b, 306c, 306d) of the checkerboard, with the plane of the checkerboard lying along the $X_w Y_w$ plane of the world coordinate system. Accordingly, in embodiments where the corner points serve as the features for calibration, the $Z_w$ world coordinate of each corner point on the target 300 is 0 and the $X_w$, $Y_w$ world coordinates of each corner point can be determined based on its 2D location (e.g., row and column position) on the checkerboard.

Figure 5:
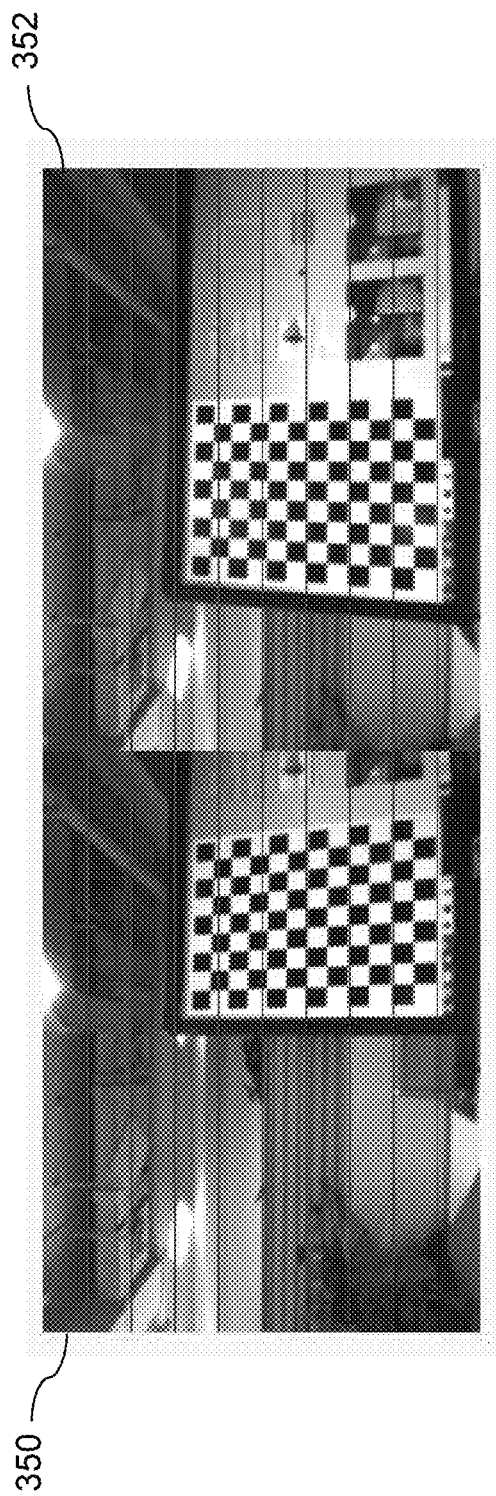
FIG. 5 illustrates images of a checkerboard calibration target, in accordance with embodiments.

FIG. 5 illustrates first and second images 350, 352 of a checkerboard calibration target similar to the target 300, in accordance with embodiments. In the embodiment of FIG. 5, the calibration target is an image displayed on a screen. However, it shall be understood that the calibration targets described herein can also be provided in other formats, such as printed on a material (e.g., a sheet of paper). The first image 350 and second image 352 of the calibration target can be obtained by a left camera and a right camera of a binocular or stereo vision imaging system, respectively, as part of a set of calibration image data for performing camera calibration. Notably, the first and second images 350, 352 both capture the entirety of the calibration target (e.g., the four outer corners of the checkerboard, the four outer edges of the checkerboard, all of the black and white squares), such that all of the features of the calibration target (e.g., all of the corner points of the checkerboard) are visible within both of the images 350, 352. Accordingly, the correspondences between image coordinates of the features (e.g., corner points) in the first image 350, image coordinates of corresponding features in the second image 352, and the world coordinates of the features in the calibration target can be identified and used to determine calibration parameters for the left and right cameras.

In some embodiments, if the calibration image data obtained by each camera does not capture the entirety of the calibration target, resulting in less than all of the features being visible within the image, it may be difficult or even impossible to determine the image-world coordinate correspondences of the features, particularly if the calibration target is imaged from multiple different camera positions and/or orientations. For example, referring again to FIG. 5, if at least one of the first and second images 350, 352 fails to capture the entirety of the checkerboard calibration target (e.g., omits at least one of the four outer corners, at least one of the four outer edges or portions thereof, at least one of the black and white squares or portions thereof) such that only a subset of the checkerboard corner points are visible, the correspondences between corner points in the image and corner points on the target may be ambiguous due to the repeating checkerboard pattern. Although this issue can be avoided in some instances by reducing the size of the calibration target or increasing the distance between the camera and calibration target so as to ensure that all of the feature points are within the field of view of each camera, these approaches may decrease calibration accuracy.

Various embodiments described herein provide improved calibration targets that permit determination of camera calibration parameters even when the image data does not capture the entirety of the calibration target and calibration target features. In some embodiments, these calibration targets include one or more reference markers situated at defined locations. The one or more reference markers can each be uniquely identifiable in image data of the calibration target, even if the image data depicts the calibration target in different positions and/or orientations. Consequently, the image-world coordinate correspondences for the features of the calibration target can be determined even when only a subset of the features are visible in the image data by using the reference markers as spatial references for unambiguously identifying each feature. Advantageously, this approach allows an image to be used for camera calibration as long as it captures all of the reference markers and at least some of the calibration features, thereby improving the flexibility and robustness of the calibration process. This can be particularly beneficial for devices that utilize multiple cameras, e.g., a UAV implementing a stereo vision sensing system, as it may be relatively difficult to arrange the cameras so that the entirety of the calibration target is within the field of view of each camera.

The characteristics of the reference markers described herein can be varied as desired, including shape, size, and/or color. Exemplary reference markers include geometric shapes (e.g., point, line, circle, triangle, quadrilateral), symbols or characters (e.g., alphanumeric character), or suitable combinations thereof. The calibration targets provided herein can include any suitable number of reference markers, such as at least one, two, three, four, five, or more reference markers. In some embodiments, the calibration targets include only three reference markers. In some embodiments, the calibration targets described herein include only a single type of reference marker. Alternatively, a calibration target can include multiple different types of reference markers, such as at least two, three, four, five, or more different types.

The characteristics of the reference markers can be selected in order to facilitate identification of the reference markers from image data, e.g., using image recognition algorithms, feature extraction algorithms, or other computer vision techniques. Optionally, the reference markers can be visually distinct from the features so as to facilitate accurate identification of the reference markers and features. For example, the reference markers can have a different shape, size, and/or color from the features. As another example, the features can be arranged in a repeating pattern (e.g., over a 1D line or a 2D surface) while the reference markers do not repeat.

The reference markers can each be positioned at a different location on the calibration target. In some embodiments, the reference markers are situated relative to the features of the calibration target in a defined arrangement such that the spatial relationship (e.g., relative position, orientation) between each feature and at least one of the reference markers is known. For example, the reference markers can be overlaid or interspersed with one or more features of the calibration target. As another example, the reference markers can be positioned near or adjacent to one or more features. The reference markers can be positioned on the calibration target such that all the reference markers and at least some of the features are simultaneously visible in images of the calibration target.

Various techniques can be used to make each reference marker uniquely identifiable in image data of the calibration target even if the image data represents a rotated and/or translated view of the calibration target. For instance, each reference marker can be of a different size, shape, and/or color, or can include unique characteristics or markings that enable it to be visually distinguished from the other markers. Alternatively or in combination, the reference markers can be arranged in a manner that enables each reference marker to be uniquely identified based on their relative positioning. In such embodiments, the reference markers may be similar or identical (e.g., with respect to shape, size, color, or other characteristics). For example, each reference marker can be positioned so as to form vertices of an irregular polygon (e.g., isosceles triangle, scalene triangle). At least some of the angles of an irregular polygon can have different sizes from other angles. Similarly, at least some of the edges of an irregular polygon can have different lengths from other edges. Optionally, all of the angles can be of different sizes and all of the edges can have different lengths. As another example, in embodiments where the features of the calibration target are arranged in a plane (e.g., a 2D repeating pattern of features such as a grid), the reference markers can form a shape that is rotationally asymmetric within the plane.

Figure 7:
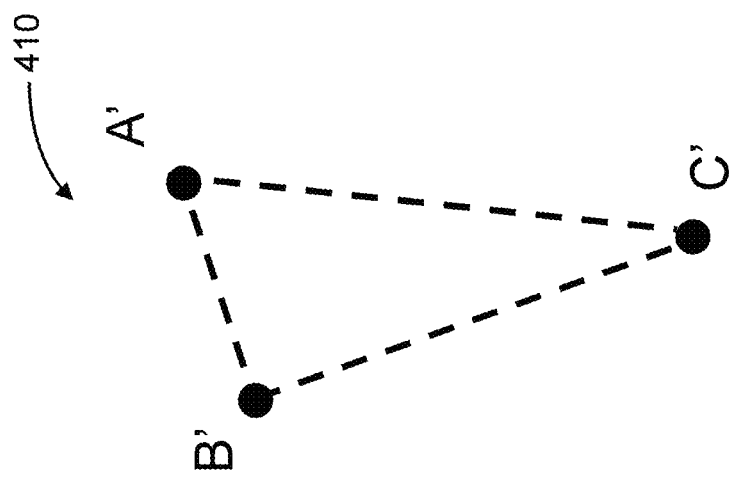
FIGS. 6 and 7 illustrate reference markers that are uniquely identifiable based on relative positioning, in accordance with embodiments.
Figure 6:
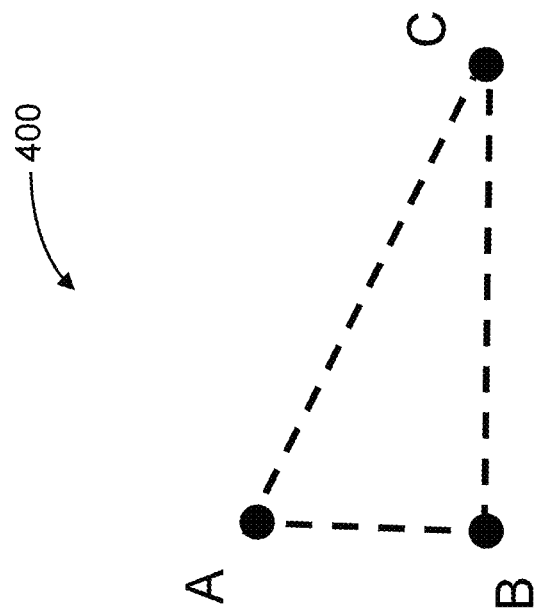

FIGS. 6 and 7 illustrate reference markers that are uniquely identifiable based on relative positioning, in accordance with embodiments. FIG. 6 illustrates a first view 400 of a plurality of reference markers A, B, C, depicted herein as black circles. The reference markers A, B, C can be arranged relative to each other so as to form vertices of a scalene triangle. FIG. 7 illustrates a second view 410 which represents a rotation and translation of the first view 400. Due to the asymmetric properties of the triangle, the reference markers A', B', and C' in the second view 410 can each be uniquely identified as corresponding to the reference markers A, B, and C in the first view 400, respectively. In some embodiments, identification of corresponding reference markers is performed based on the positioning of the reference markers relative to the features of the triangle (e.g., edges, angles) in the first and second views 400, 410. For example, in the embodiment of FIGS. 6 and 7, the markers B and B' are both positioned opposite the longest edge of the triangle and the markers C and C' are both positioned opposite the shortest edge of the triangle. As another example, the markers B and B' are both positioned at the vertex of the largest interior angle of the triangle and the markers C and C' are both positioned at the vertex of the smallest interior angle of the triangle. Although the reference markers in FIGS. 6 and 7 are depicted as forming a triangle, it shall be appreciated that the reference markers can be arranged to form other irregular polygons (e.g., irregular polygons with three, four, five, six, or more vertices). This approach can render each marker uniquely identifiable regardless of the position and/or orientation from which the reference markers are viewed.

Figure 8:
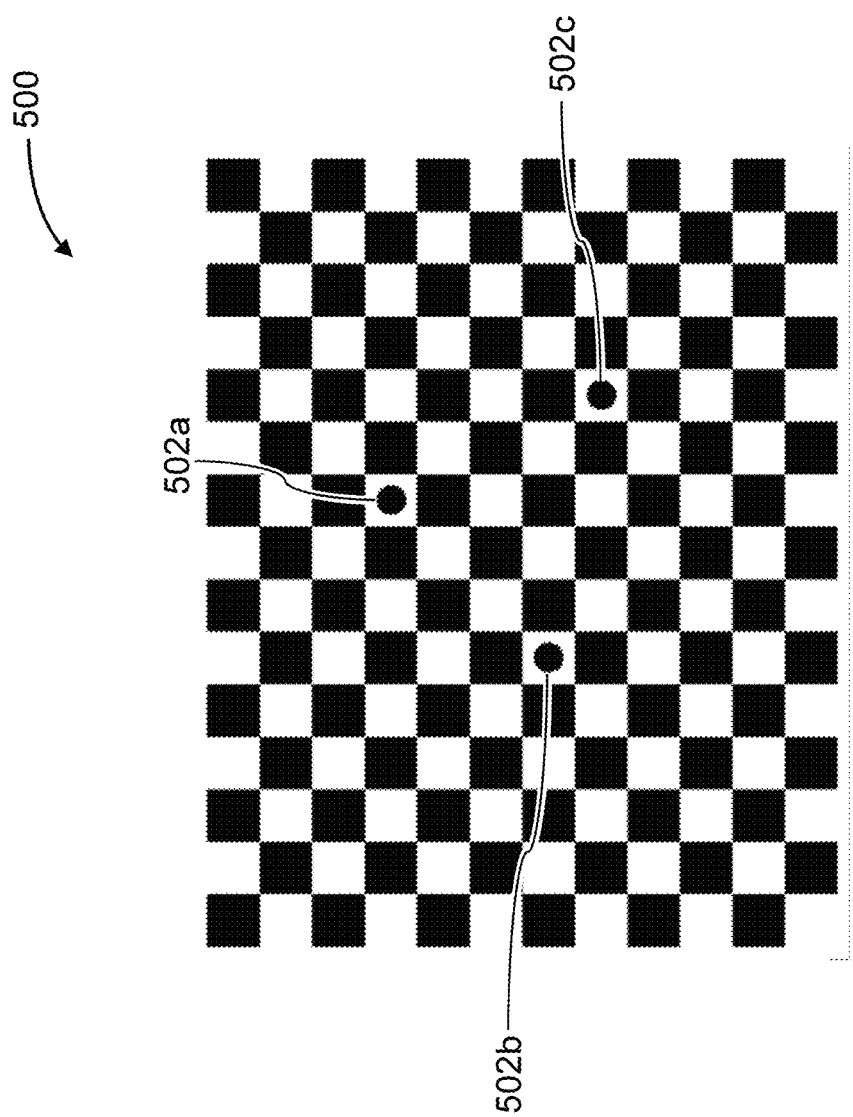
FIG. 8 illustrates a calibration target having reference markers, in accordance with embodiments.

FIG. 8 illustrates a calibration target 500 having reference markers 502*a*, 502*b*, 502*c*, in accordance with embodiments. Similar to the calibration target 300, the calibration target 500 includes a checkerboard having a repeating pattern of alternating black and white squares. In the embodiment of FIG. 8, the reference markers 502a-c are identical black circles each positioned within a different white square of the checkerboard. However, it shall be appreciated that in alternative embodiments, at least some of the reference markers 502a-c can be white circles positioned within black squares. The reference markers 502a-c are situated on the calibration target 500 in a known position relative to the checkerboard, e.g., the row and column position of each markers is known. Each reference marker 502a-c can be located on a different portion of the checkerboard (e.g., different row and/or column positions). In some embodiments, the reference markers 502a-c are arranged on the target 500 so as to form vertices of an irregular triangle. Accordingly, if an image of the target 500 includes all three reference markers 502a-c, each reference marker 502a-c is uniquely identifiable even if only some of the target 500 is visible (e.g., at least one of the four outer corners, four outer edges, black squares, and/or white squares of the checkerboard is omitted from the image). Once each reference marker 502a-c has been identified in the image data, the spatial relationship (e.g., rotation, transformation) between the reference markers in the image and the reference markers on the calibration target 500 can be determined. This spatial relationship can then be used to determine the world coordinates of each feature (e.g., corner point) depicted in the image data.

Figure 9:
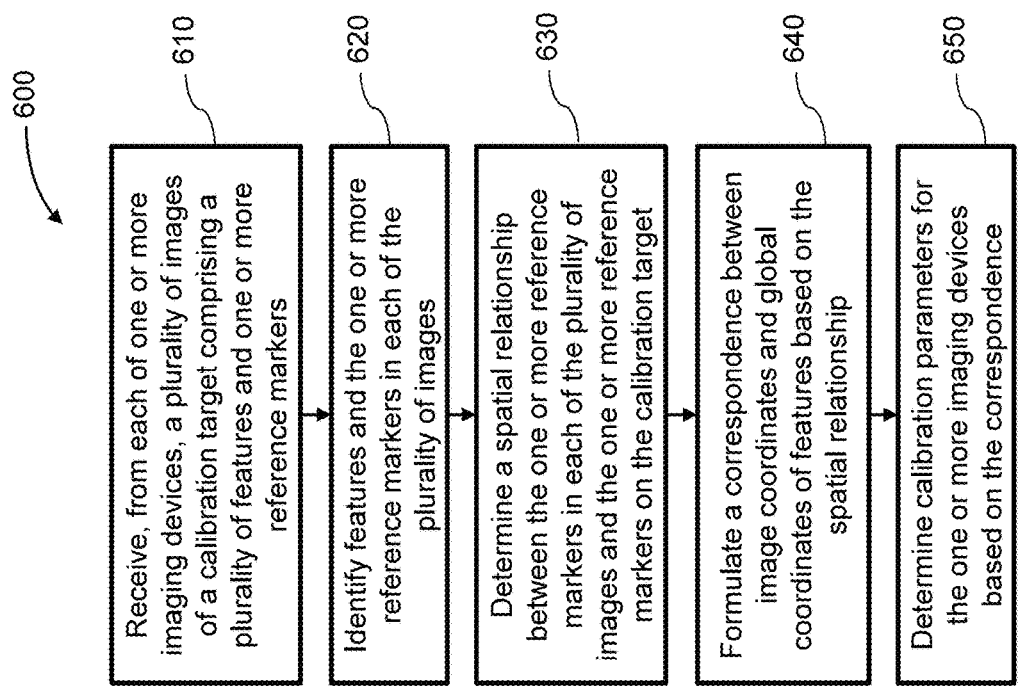
FIG. 9 illustrates a method for calibrating one or more imaging devices using a calibration target with one or more reference markers, in accordance with embodiments.

FIG. 9 illustrates a method 600 for calibrating one or more imaging devices using a calibration target with one or more reference markers, in accordance with embodiments. At least some of the steps of the method 600 can be practiced by a suitable computing system or device, such as by one or more processors. In embodiments where the imaging devices are carried by a movable object, some or all of the steps of the method 600 can be performed when the movable object is not in operation (offline calibration). Alternatively, some or all of the steps can be performed while the movable object is operating (online calibration).

In step 610, a plurality of images of a calibration target is received from each of one or more imaging devices (e.g., one or more cameras). The calibration target can include a plurality of features and one or more reference markers, as previously described herein. The plurality of features can be arranged in any suitable configuration, e.g., a repeating pattern such as a grid. The one or more reference markers can be designed to be uniquely identifiable in the images, as discussed above. The plurality of images provided by each imaging device can include images taken at a plurality of different positions and/or orientations relative to the calibration target. Each image can capture all of the reference markers and at least some of the plurality of features of the calibration target. In some embodiments, at least one of the images generated by the imaging devices captures less than all of the plurality of features of the calibration target.

In step 620, features and the one or more reference markers in each image of the plurality of images provided by each imaging device are identified. For example, each image can be processed using various computer vision algorithms so as to identify the reference markers and features visible in the image. In some embodiments, the algorithm can be performed based on information regarding the known characteristics of the reference markers and/or features (e.g., shape, size, color, relative positioning) in order to facilitate identification. Once the reference markers and/or features have been identified, they can be assigned image coordinates representing their pixel positions within the image. For example, the image coordinates for a circular reference marker can be the coordinates of the center of the circle. Optionally, the images can be corrected and/or pre-processed prior to the identification procedure in order to improve identification accuracy, e.g., by reducing noise, discarding images that are deemed unsuitable for analysis, and so on.

Figure 11:
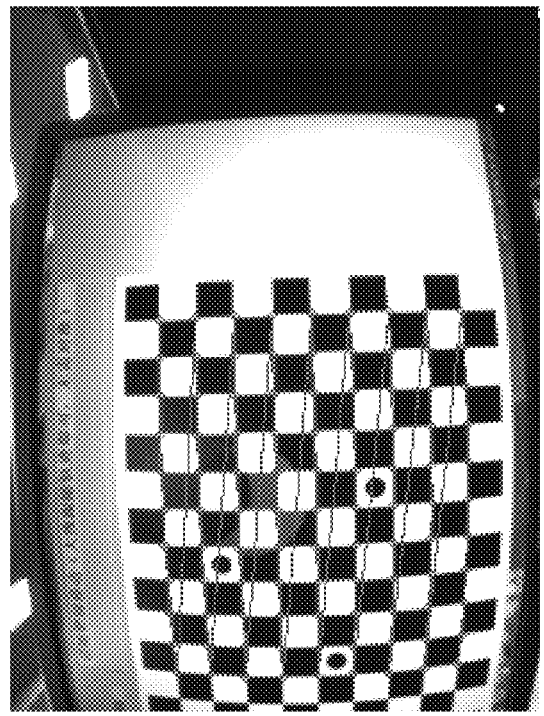
FIGS. 10 through 13 illustrate identification of features and reference markers of a calibration target in an image, in accordance with embodiments.
Figure 10:
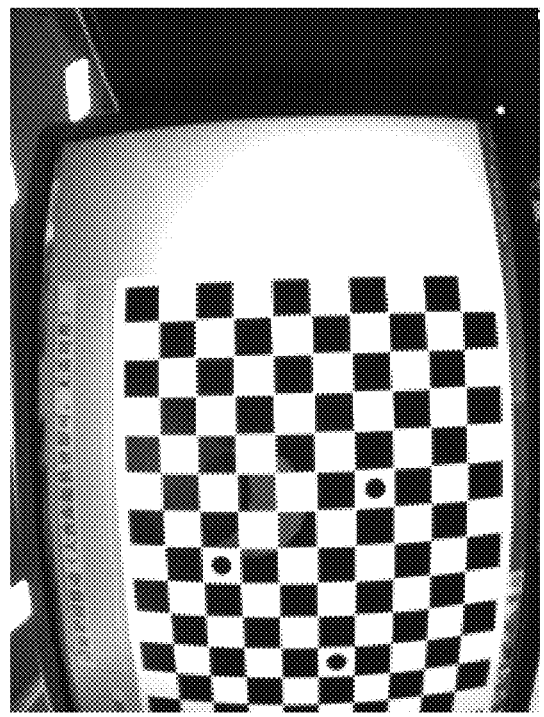
Figure 12:
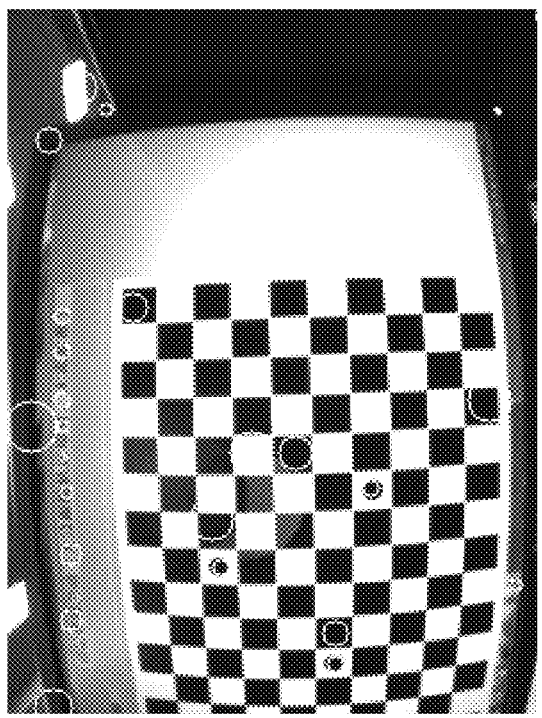

FIGS. 10 through 13 illustrate identification of features and reference markers of a calibration target in an image, in accordance with embodiments. FIG. 10 illustrates an image capturing a portion of a checkerboard calibration target with three black circular reference markers, similar to the target 500. Notably, the image omits certain portions of the calibration target, e.g., the upper and lower left corners of the checkerboard and the left edge of the checkerboard, such that only some of the corner points of the checkerboard are visible. However, all three reference markers and the corner points near the reference markers are visible. Since the three reference markers are arranged on the calibration target so as to form an irregular polygon, the reference markers are each uniquely identifiable even though some regions of the calibration target are not captured in the image. FIG. 11 illustrates the image of FIG. 10 following processing to identify the corner points of the checkerboard squares. The corner points can serve as features for camera calibration, as previously described herein. In some embodiments, if the corner point identification algorithm fails (e.g., no corner points are identified), the image is considered invalid. FIG. 12 illustrates the image of FIG. 10 following processing to identify the reference markers. The circular reference markers can be identified using suitable detection methods such as a Hough transform. If the algorithm fails to identify any reference markers, the image may be considered invalid.

Figure 13:
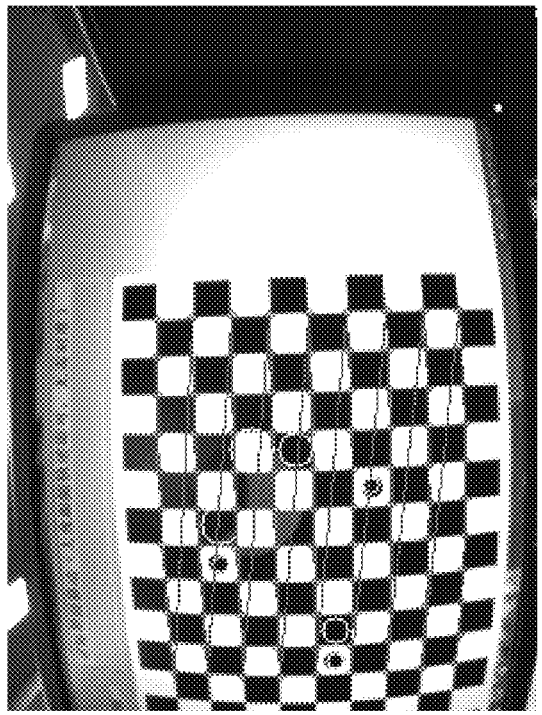

In some embodiments, the reference marker detection algorithm may produce false positives, e.g., identify regions of the image that are not reference markers. For example, the image of FIG. 12 includes several erroneous results in which portions of the image which are not the reference markers are mistakenly identified. This can occur, for instance, when the detection algorithm relies upon shape recognition (e.g., recognition of circles) to identify the reference markers and similarly-shaped objects are visible in the image. FIG. 13 illustrates filtering the results of FIG. 12 to reduce the incidence of false positives. In embodiments where the reference markers are interspersed with or overlaid with the features of the calibration target, the image data can be filtered to limit the reference marker identification results to those within the convex hull of the identified features. In FIG. 13, the false positives lying outside the convex hull of the identified corner points have been removed. The reference markers can be determined from the remaining results based on the knowledge of the relative positioning of the reference markers. In some embodiments, the position information (e.g., row and column information and/or image coordinates) for each result can be determined. The set of position information can then be analyzed to identify the reference markers that are in the correct spatial relationship with each other. For example, referring again to FIG. 13, since it is known that the reference markers on the target form the vertices of a triangle and the properties of the triangle are predetermined (e.g., edge length, angles), the results can be searched in order to identify the set that would satisfy this geometric constraint. If no such results are found, or if more than one set of results are found, the image may be considered invalid.

In step 630, a spatial relationship is determined between the one or more reference markers in each image of the plurality of images and the one or more reference markers on the calibration target. As previously described, since the reference markers are configured so as to be uniquely identifiable, the spatial relationship (e.g., translation, rotation, flipping) by comparing how the position of the reference markers in the image data differs from the known positions of the reference markers on the actual calibration target. Such differences may arise based on the position and/or orientation of the imaging device relative to the calibration target during image capture. For example, in embodiments where the one or more reference markers form vertices of an irregular polygon in the image data, the spatial relationship can be determined by identifying how the vertices of the irregular polygon in the image data correspond to the known positions of the vertices on the actual target. In embodiments where a checkerboard calibration target is used and the reference markers are positioned in certain squares of the checkerboard, the spatial relationship can be determined by identifying position information (e.g., row and column position) for each of the reference markers in the image and comparing this information to the known position information (e.g., row and column position) on the actual checkerboard.

In step 640, a correspondence between image coordinates of features in the image data and global coordinates (world coordinates) for corresponding features on the calibration target is formulated based on the spatial relationship determined in step 630. For example, the positions of each feature point on the actual calibration target can be determined using the determined spatial relationship. Each feature can then be assigned a set of world coordinates indicating the position of the feature point relative to the world coordinate system. Accordingly, since the image coordinates and the world coordinates of each feature are known, the correspondence or mapping between the image and world coordinates can be formulated.

In embodiments where a plurality of imaging devices are being calibrated, with each imaging device providing a respective set of images, the step 640 can involve identifying the features that are present in each of the respective image sets, and then determining world coordinates for only these features. For example, for binocular calibration using corner points of a checkerboard, the step 640 can involve identifying the corner points that are visible in both the left and right camera images and determining the world coordinates for those common corner points. Since both the left and right images depict all of the reference markers of the calibration target as discussed above, the left and right images should both include at least the features near the reference markers. In alternative embodiments, this process can be reversed, by determining world coordinates for all the features visible in the images produced by multiple imaging devices prior to determining which features are common across the different image sets.

In step 650, calibration parameters for the one or more imaging devices are determined based on the correspondence formulated in step 640. As previously described herein, the calibration parameters can include parameters relating to camera intrinsic matrix (e.g., the focal length, position of the principal point, pixel size), rotation matrices and translation vectors between the camera and world coordinate systems, and/or optical distortion (e.g., radial distortion, eccentric distortion, thin prism distortion) for each of the one or more imaging devices. Once the image-world coordinate correspondences for the features are determined, as described above with respect to step 640, this correspondence information can be used to solve for the various calibration parameters.

Various methods can be used to solve for calibration parameters. In some embodiments, an initial estimate of the calibration parameters is first obtained. For example, a mapping model (e.g., the mapping model 200 or 250) can be used to obtain the following mapping equation between the world coordinate system and the image coordinate system for monocular camera calibration, disregarding distortion effects:

$$\lambda \begin{bmatrix} u \\ v \\ 1 \end{bmatrix} = M[R:T] \begin{bmatrix} X_w \\ Y_w \\ Z_w \\ 1 \end{bmatrix} \quad (5)$$

where $R=[r_1\ r_2\ r_3]$ (a 3×3 matrix), T is a 3×1 vector, and $\lambda=Z_c$ (the Z-axis component of a point after being transformed from the world coordinate system to the camera coordinate system).

In embodiments where the calibration target is planar, e.g., a planar checkerboard, the target plane can be assumed to lie on the $X_w Y_w$ plane of the world coordinate system, such that the $Z_w$ coordinate of each feature on the target is 0. Accordingly, the above equation can be rewritten as:

$$\lambda \begin{bmatrix} u \\ v \\ 1 \end{bmatrix} = M[r_1\ r_2\ r_3\ T] \begin{bmatrix} X_w \\ Y_w \\ 0 \\ 1 \end{bmatrix} = M[r_1\ r_2\ T] \begin{bmatrix} X_w \\ Y_w \\ 1 \end{bmatrix} \quad (6)$$

The homography matrix H can then be defined as $H=[h_1\ h_2\ h_3]=sM[r_1\ r_2\ T]$, where $s=1/\lambda$. $\lambda$ in the homography matrix equation may correspond to an average value rather than to a single point.

Since the world coordinates of the features are known, e.g., as determined in step 640, the homography matrix H can be solved. Based on the definition of the homography matrix, the following equation can be obtained:

$$\begin{cases} r_1 = \lambda M^{-1} h_1 \\ r_2 = \lambda M^{-1} h_2 \\ T = \lambda M^{-1} h_3 \end{cases} \quad (7)$$

Since $r_1$ and $r_2$ are vectors in the rotation matrix, the following equation can be obtained:

$$r_1^T r_2 = 0 \Rightarrow h_1^T M^{-T} M^{-1} h_2 = 0$$

$$r_1^T r_1 = r_2^T r_2 = 1 \Rightarrow h_1^T M^{-T} M^{-1} h_1 = h_1^T M^{-T} M^{-1} h_2 \quad (8)$$

Defining $$B = M^{-T} M^{-1} = \begin{bmatrix} B_{11} & B_{12} & B_{13} \\ B_{21} & B_{22} & B_{23} \\ B_{31} & B_{32} & B_{33} \end{bmatrix},$$

the following can be obtained:

$$h_i^T B h_j = v_{ji}^T b = \begin{bmatrix} h_{i1}h_{j1} \\ h_{i1}h_{j2} + h_{i2}h_{j1} \\ h_{i1}h_{j3} + h_{i3}h_{j1} \\ h_{i2}h_{j2} \\ h_{i3}h_{j2} + h_{i2}h_{j3} \\ h_{i3}h_{j3} \end{bmatrix}^T \begin{bmatrix} B_{11} \\ B_{12} \\ B_{13} \\ B_{22} \\ B_{23} \\ B_{33} \end{bmatrix} \quad (9)$$

According to equation (8), the following can be obtained:

$$Vb = \begin{bmatrix} v_{12}^T \\ v_{11}^T - v_{22}^T \end{bmatrix} b = 0 \quad (10)$$

In equation (10), V is a 2×6 matrix and is transformed from the homography matrix H. In order to solve for b, at least three different H are used to constrain the matrix B. Accordingly, the parameter estimation can be performed with data from at least three different images of the calibration target at different positions and/or orientations.

If the matrix B can be solved, the matrix M can also be solved. Subsequently, R and T can be solved, according to equation (7). The closed solution can be as follows, based on different forms of the matrix M:

If the "tangential effect" is not considered, and if $$M = \begin{bmatrix} f_x & 0 & u_0 \\ 0 & f_y & v_0 \\ 0 & 0 & 1 \end{bmatrix},$$

then $$\begin{cases} f_x = \sqrt{k/B_{11}} \\ f_y = \sqrt{kB_{11}/(B_{11}B_{12} - B_{12}^2)} \\ u_0 = -B_{13}f_x^2/k \\ v_0 = (B_{12}B_{13} - B_{11}B_{23})/(B_{11}B_{22} - B_{12}^2) \\ k = B_{33} - [B_{13}^2 + v_0(B_{12}B_{13} - B_{11}B_{23})]/B_{11} \end{cases} \quad (11)$$

If the "tangential effect" is not considered, and if $$M = \begin{bmatrix} f_x & \gamma & u_0 \\ 0 & f_y & v_0 \\ 0 & 0 & 1 \end{bmatrix},$$

then $$\begin{cases} f_x = \sqrt{k/B_{11}} \\ f_y = \sqrt{kB_{11}/(B_{11}B_{12} - B_{12}^2)} \\ \gamma = -B_{12}f_x^2 f_y/k \\ u_0 = \gamma v_0/f_y - B_{13}f_x^2/k \\ v_0 = (B_{12}B_{13} - B_{11}B_{23})/(B_{11}B_{22} - B_{12}^2) \\ k = B_{33} - [B_{13}^2 + v_0(B_{12}B_{13} - B_{11}B_{23})]/B_{11} \end{cases} \quad (12)$$

After the initial solution is obtained, the calibration parameters can be optimized, e.g., by the Levenberg-Marquardt algorithm. In some embodiments, the optimal solution minimizes the following object function:

$$\Sigma_i \Sigma_j \|m_{ij} - \hat{m}(M,K,P,R,T)\|^2 \quad (13)$$

In embodiments where multiple imaging devices are being calibrated (e.g., two or more cameras), the step 650 can also include solving for the rotation matrix R and translation vector T between each of the camera coordinate systems. These extrinsic parameters can be obtained based on the monocular calibration methods described herein. For example, in binocular calibration (calibration of two imaging devices), for a spatial point observed by a left and right camera, the coordinate $P_l$ in the left camera coordinate system and the coordinate $P_r$ in the right camera coordinate system can satisfy the following relation:

$$P_l = RP_r + T \quad (14)$$

where R is the rotation matrix from the right camera coordinate system to the left camera coordinate system, and T is the translation vector from the left camera coordinate system origin $O_l$ to the right camera coordinate system origin $O_r$.

Figure 14:
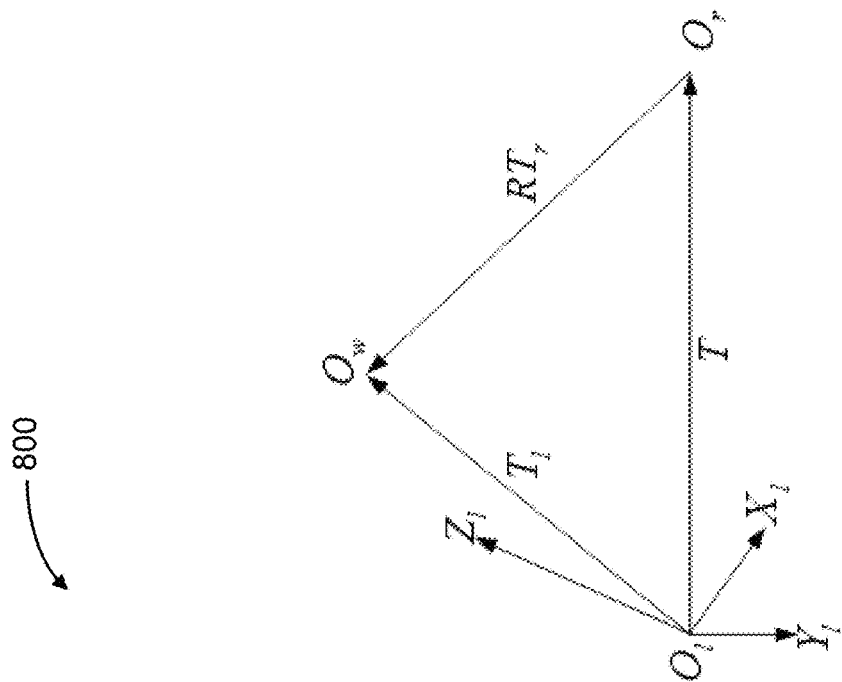
FIG. 14 illustrates a model of spatial relationships between coordinate systems in binocular camera calibration, in accordance with embodiments.
Figure 14:
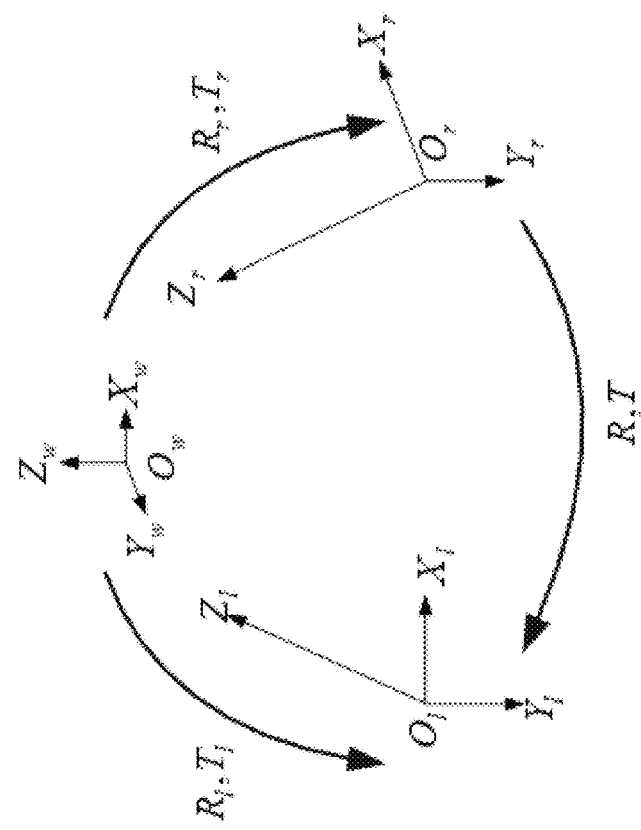

FIG. 14 illustrates a model 800 of spatial relationships between coordinate systems in binocular camera calibration, in accordance with embodiments. The world coordinate system ($X_w Y_w Z_w$, with origin $O_w$) is related to the left camera coordinate system ($X_l Y_l Z_l$, with origin $O_l$) by rotation matrix $R_l$ and translation vector $T_l$ and to the right camera coordinate system ($X_r Y_r Z_r$, with origin $O_r$) by rotation matrix $R_r$ and translation vector $T_r$. These rotation matrices and translation vectors can be obtained using the methods previously described herein. The rotation matrix R and translation vector T for converting between the left and right camera coordinate systems can then be determined by the following relation:

$$\begin{cases} R = R_l (R_r)^T \\ T = T_l - RT_r \end{cases} \quad (15)$$

Once the calibration parameters have been determined in accordance with the methods described herein, the parameters can be used to process image data obtained by the imaging devices such that the image data is rendered suitable for various downstream applications, e.g., recovery of 3D spatial information for generation of maps, object recognition, navigation, etc. For example, the image data can be processed based on the determined calibration parameters in order to correct for the effects of optical distortion associated with the one or more imaging devices, also referred to herein as "undistortion." As another example, in embodiments where two or more imaging devices are used to capture respective sets of the image data, the calibration parameters can be used to perform rectification, e.g., to enable the image data sets to be used for stereo vision.

Figure 15:
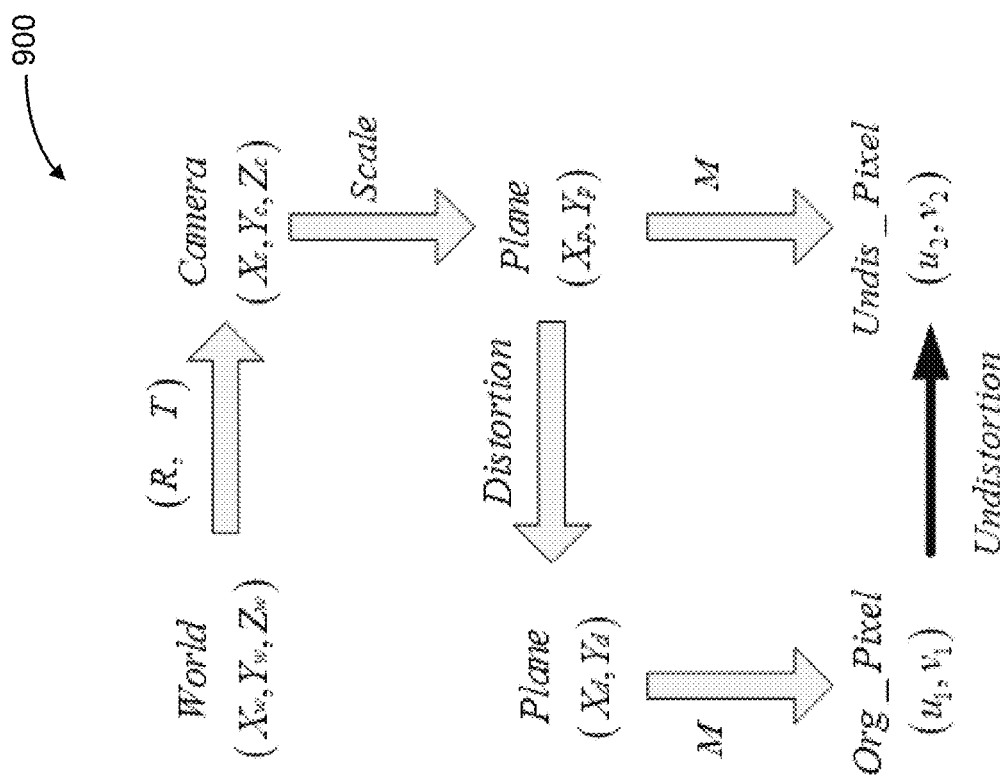
FIG. 15 illustrates a model of a mapping between distorted image coordinates and undistorted image coordinates, in accordance with embodiments.

FIG. 15 illustrates a model 900 of a mapping between distorted image coordinates and undistorted image coordinates, in accordance with embodiments. Distortion can occur in images captured by an imaging device due to the optical properties of the lens. Image undistortion can be used to remove the effects of distortion in an image captured by the imaging device (e.g., an image having distorted image or pixel coordinates ($u_1$, $v_1$) corresponding to distorted image plane coordinates ($X_d$, $Y_d$)) so as to obtain an undistorted image according to the ideal pinhole camera model (e.g., an image having undistorted image or pixel coordinates ($u_2$, $v_2$) corresponding to undistorted image plane coordinates ($X_p$, $Y_p$)). Accordingly, image undistortion can be used to transform a distorted image into an undistorted image. The image undistortion procedure can be performed based on previously determined intrinsic parameters for the imaging devices (e.g., distortion parameters, camera intrinsic matrix M). Such parameters can be determined using the approaches presented herein.

Various methods can be used to perform image undistortion. For example, the undistorted image plane coordinates ($X_p$, $Y_p$) can be determined from the undistorted pixel coordinates ($u_2$, $v_2$) according to the following equation:

$$\begin{bmatrix} X_p \\ Y_p \\ 1 \end{bmatrix} = M^{-1} \begin{bmatrix} u_2 \\ v_2 \\ 1 \end{bmatrix} \quad (16)$$

The distorted image plane coordinates ($X_d$, $Y_d$) can be determined from the undistorted image plane coordinates ($X_p$, $Y_p$) based on a mathematical distortion model (e.g., the model described by the distortion equation (3) previously presented herein) and previously determined values for the distortion parameters. The pixel coordinates of the distorted image ($u_1$, $v_1$) can then be obtained by the following equation:

$$\begin{bmatrix} u_1 \\ v_1 \\ 1 \end{bmatrix} = M \begin{bmatrix} X_d \\ Y_d \\ 1 \end{bmatrix} \quad (17)$$

The grayscale value of the undistorted pixel coordinates ($u_2$, $v_2$) can be obtained by interpolating the distorted pixel coordinates ($u_1$, $V_1$). The interpolation can be performed using any suitable method, such as nearest neighbor interpolation or bilinear interpolation. Accordingly, the undistorted image can be obtained.

Similar to the image undistortion process described herein, image rectification, also known as stereo rectification, can involve an image-to-image transformation process. However, image rectification also involves a spatial transformation on the camera coordinate system level. Image rectification can be used to process image data captured by multiple imaging devices in order to facilitate the implementation of stereo vision algorithms, e.g., for the generation of depth maps, disparity maps, and other 3D representations of a scene. For example, in some embodiments, stereo vision algorithms may involve determining point correspondences between images captured by different cameras (e.g., a left camera and a right camera). Image rectification can be used to project the image data obtained by each camera into a common plane, thereby simplifying the procedure of searching for matching image points in the images.

Figure 16:
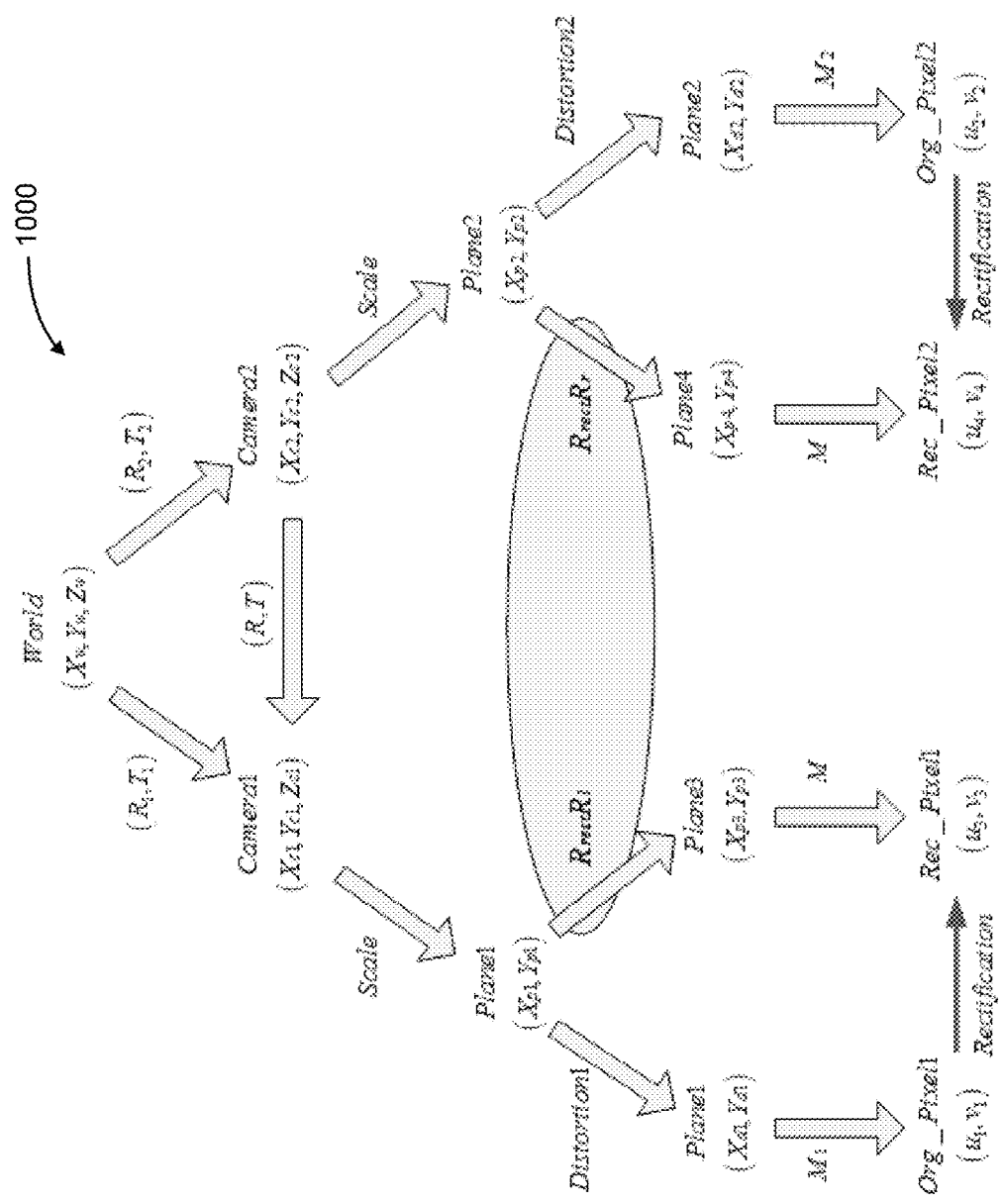
FIGS. 16 and 17 illustrate an image rectification procedure for a binocular camera system, in accordance with embodiments.
Figure 17:
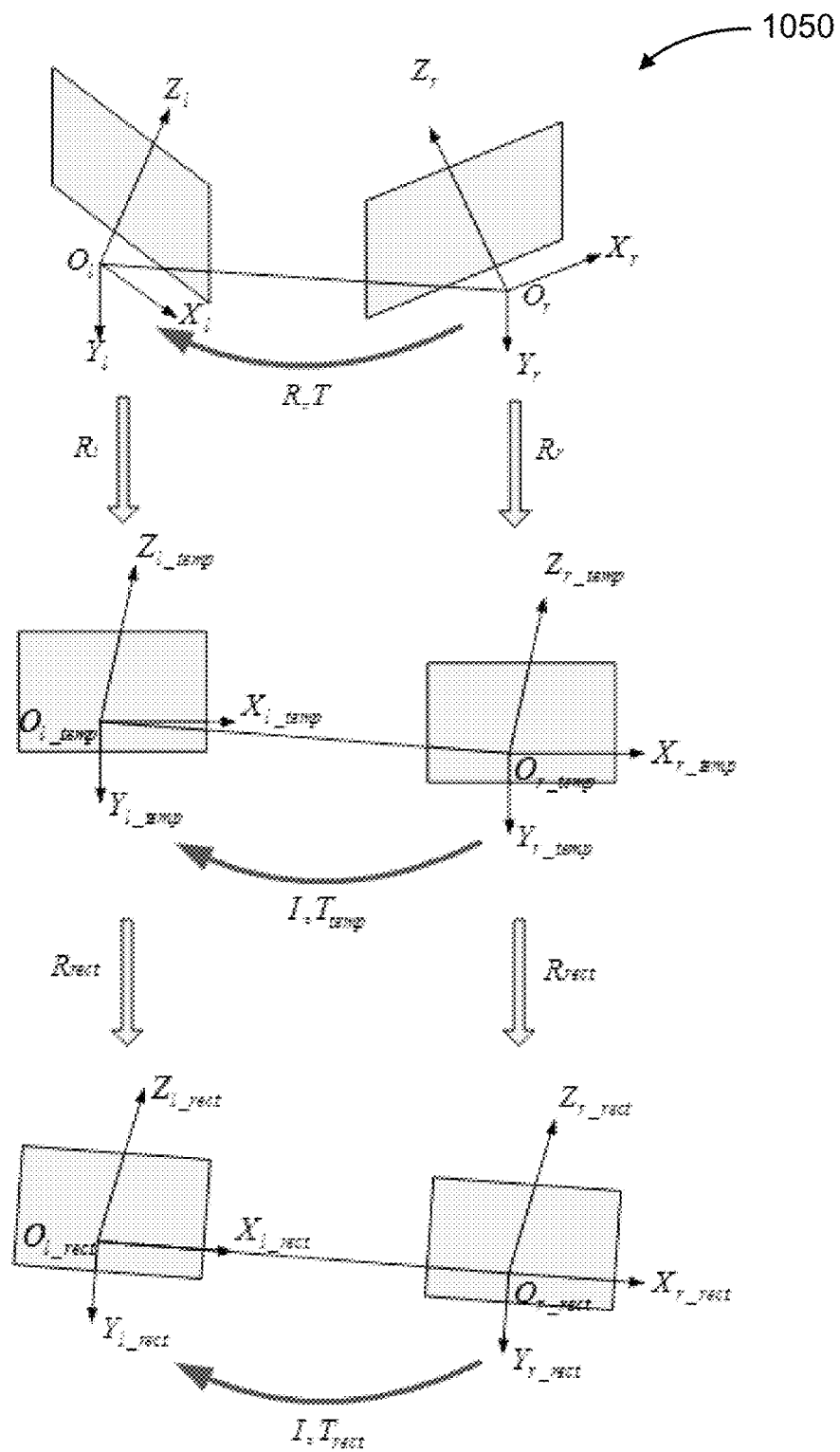

FIGS. 16 and 17 illustrate an image rectification procedure for a binocular camera system, in accordance with embodiments. FIG. 16 illustrates a model 1000 of a mapping between left camera coordinate system (Cameral) and right camera coordinate system (Cameral) for stereo vision. The image rectification process can involve determining the rotation matrices $R_l$, $R_r$, and $R_{rect}$ used to rectify the left and right image data. In some embodiments, these matrices are configured so as to maximize the overlapping portions of the left and right images after rectification and minimize the amount of image deformation. Furthermore, if the same matrix M is used in both rectification images, the rectified images can have the same scale, thereby facilitating calculation of the depth of field.

FIG. 17 illustrates a model 1050 of a mapping between unrectified and rectified camera coordinate systems. In some embodiments, the rotation matrices $R_l$ and $R_r$ can satisfy the equation $$R_l^T R_r = R \quad (18)$$

where R is the rotation matrix from the right camera coordinate system ($X_r$, $Y_r$, $Z_r$) to the left camera coordinate system ($X_l$, $Y_l$, $Z_l$). $R_l$ and $R_r$ are the rotation matrices from the left camera coordinate system to a first temporary coordinate system ($X_{l\_temp}$, $Y_{l\_temp}$, $Z_{l\_temp}$) and the right camera coordinate system to a second temporary coordinate system ($X_{r\_temp}$, $Y_{r\_temp}$, $Z_{r\_temp}$), respectively. In some embodiments, $R_l^T$ can be set to be equal to $R_r$, such that the rotation angle of the rotation matrix R is equally divided. The left and right camera coordinate systems can be transformed according to $R_l$ and $R_r$, respectively, such that the spatial posture of the two camera coordinate systems is identical after transformation. However, there may be a translation vector $T_{temp} = R_l T$ in the coordinate system obtained by transforming the left camera coordinate system according to $R_l$.

The two coordinate systems can then be simultaneously transformed by the rotation matrix $R_{rect}$, such that the XOY planes of the two coordinate systems are co-planar and both X-axes are parallel with the baseline. The matrix $R_{rect}$ can be subjectively determined. For example, $R_{rect}$ can be expressed as $$R_{rect} = \begin{bmatrix} e_1^T \\ e_2^T \\ e_3^T \end{bmatrix} \quad (19)$$

where $$e_1 = \frac{T_{temp}}{\|T_{temp}\|}, \quad e_2 = \frac{[-T_{temp\_y} \quad T_{temp\_x} \quad 0]^T}{\sqrt{T_{temp\_x}^2 + T_{temp\_y}^2}},$$

$e_3 = e_1 \times e_2$, $T_{temp} = R_l T$ (a 3×1 matrix), $T_{temp\_x}$ is defined as the first column of the first row of $T_{temp}$, and $T_{temp\_y}$ is defined as the first column of the second row of $T_{temp}$.

In some embodiments, after the rotation of the camera coordinate systems, there is only a translation vector $T_{rect} = R_{rect} R_l T$, which is parallel with the X-axis and between the two coordinate systems. Optionally, the matrix M can be substituted with the matrix $M_1$ (see FIG. 10A).

After the rotation matrices $R_l$, $R_r$, and $R_{rect}$ and the mapping matrix M are determined, the image rectification procedure can be performed similarly to the single image undistortion procedure described above. The image rectification can be performed separately on each set of images obtained by each individual imaging device. For example, referring again to FIG. 16, for a point ($u_3$, $v_3$), a reverse mapping can be performed to obtain the coordinate ($X_{pl}$, $Y_{pl}$, $Z_{pl}$) under the original left camera coordinate system:

$$\begin{bmatrix} X_{pl} \\ Y_{pl} \\ Z_{pl} \end{bmatrix} = (R_{rect}R_l M)^{-1} \begin{bmatrix} u_3 \\ v_3 \\ 1 \end{bmatrix} \quad (20)$$

This can be scaled to obtain the following relation:

$$X_{pl}'=X_{pl}/Z_{pl}$$

$$Y_{pl}'=Y_{pl}/Z_{pl} \quad (21)$$

The distorted coordinates can be obtained according to the previously determined distortion parameters and a distortion model (e.g., equation (3)). The pixel coordinates ($u_1$, $v_1$) under the original left coordinate system can then be obtained:

$$\begin{bmatrix} u_1 \\ v_1 \\ 1 \end{bmatrix} = M \begin{bmatrix} X_d \\ Y_d \\ 1 \end{bmatrix} \quad (22)$$

The grayscale value of the rectified image coordinates ($u_3$, $v_3$) can be determined using any suitable interpolation algorithm. This rectification process can also be used to obtain rectified image coordinates for the right camera.

Figure 18:
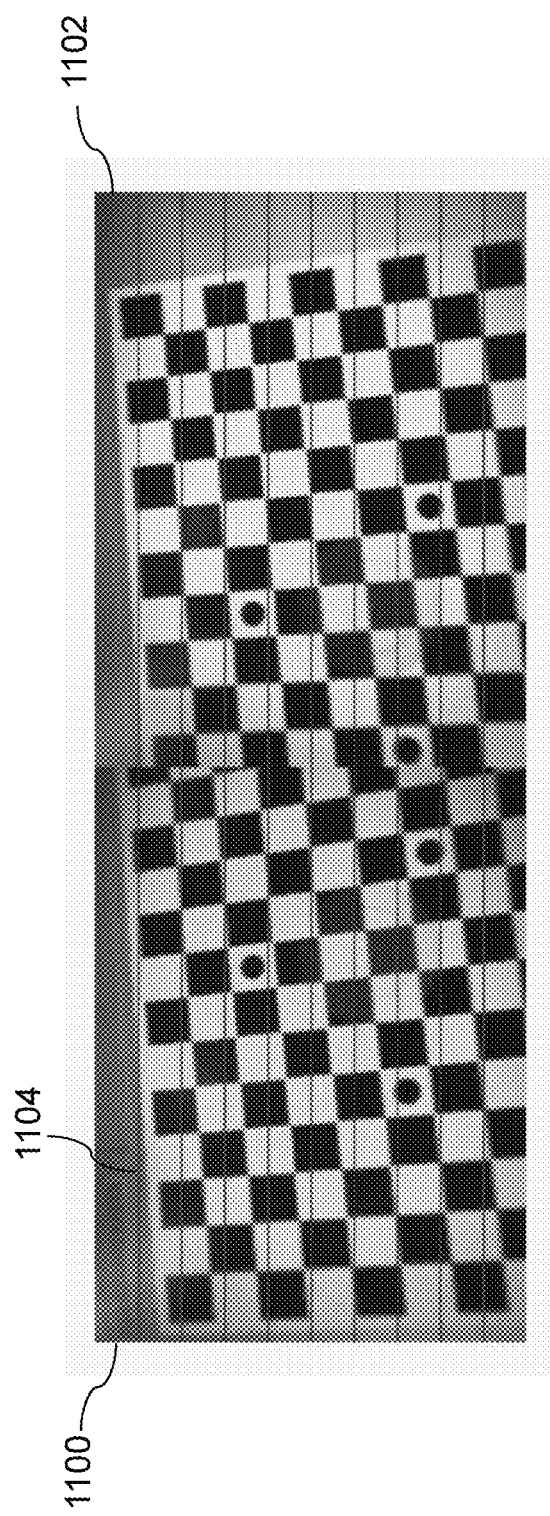
FIG. 18 illustrates binocular camera images following processing to perform image rectification, in accordance with embodiments.

FIG. 18 illustrates binocular camera images following processing to perform image rectification, in accordance with embodiments. The images include a first rectified image 1100 obtained by a left camera and a second rectified image 1102 obtained by a right camera. Notably, objects in the first image 1100 are horizontally aligned with corresponding objects in the second image 1102, as indicated by the overlaid horizontal lines 1104.

Once the image data obtained from the one or more images has been processed by undistortion and/or rectification as described herein, the images can be used for various applications, such as computer vision applications. In some embodiments, the images can be used to recover spatial information for the imaged scene, such as the distances of objects in the scene from the imaging devices. This spatial information can be used, for instance, to generate 3D representations of the environment, such as depth maps, disparity maps, occupancy grids, point clouds, and so on.

Figure 19:
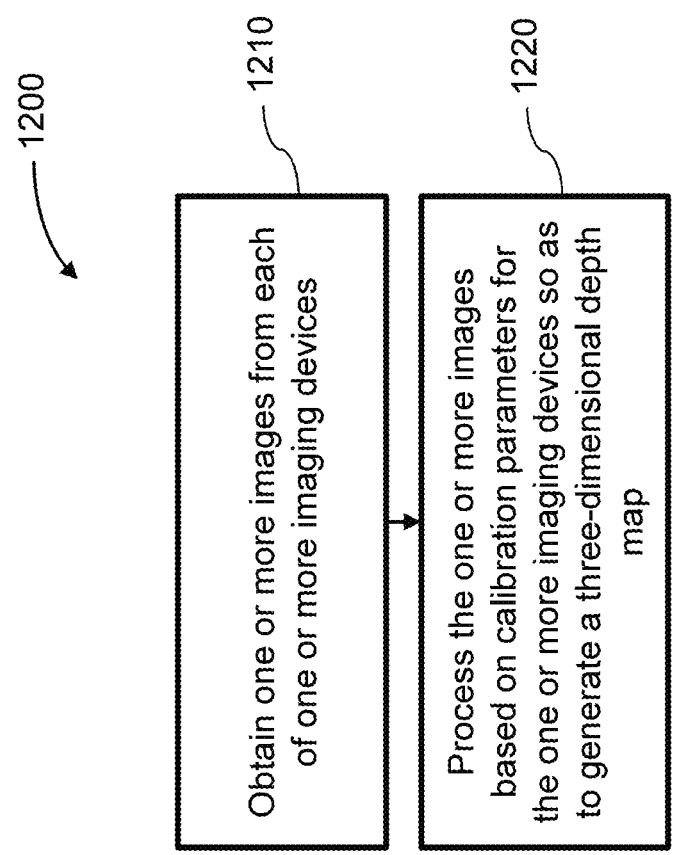
FIG. 19 illustrates a method for generating depth maps from image data, in accordance with embodiments.

FIG. 19 illustrates a method 1200 for generating depth maps from image data, in accordance with embodiments. At least some of the steps of the method 1200 can be practiced by a suitable computing system or device, such as by one or more processors.

In step 1210, one or more images are obtained from each of one or more imaging devices. The imaging devices can be configured to capture the images at the same time or substantially the same time so as to generate corresponding images of a scene. The imaging devices can be located relative to each other so as to produce images of the same scene from different positions and/or orientations. For example, a UAV equipped with a binocular vision system can have a left camera and a right camera that capture images of the environment surrounding the UAV at the same time but from two different positions and/or orientations. Accordingly, objects in the scene will have different image coordinates in images obtained by different imaging devices.

In step 1220, the one or more images from each of the one or more imaging devices are processed based on calibration parameters for the one or more imaging devices so as to generate a 3D depth map. The calibration parameters can include intrinsic and/or extrinsic parameters for the imaging devices, as previously described herein, and can be previously determined using any of the calibration methods described herein, such as the method 600. The calibration method can be an online calibration method or an offline calibration method. In some embodiments, the calibration parameters are determined using a plurality of calibration images of a calibration target from each of the one or more imaging devices. The calibration target can be any of the embodiments presented herein, e.g., a checkerboard calibration target. For instance, the calibration target can include a plurality of features arranged in a repeating pattern and one or more reference markers. The one or more reference markers can be designed to each be uniquely identifiable within each calibration image obtained imaging devices, e.g., as discussed above with respect to the embodiments of FIGS. 6, 7, and 8. In some embodiments, at least one of the calibration images captures less than all of the features of the calibration target. As previously discussed, the methods described herein can be used to determine calibration parameters from the calibration images even when some or all of the images do not capture all the features of the calibration target features, as described herein.

Various methods can be used to process the images so as to enable generation of a 3D depth map from the images. For example, the images can be processed by the image undistortion and/or rectification techniques discussed herein. The rectified images can then be used as input into various stereo vision algorithms so as to recover depth information for the objects in the images, therefore generating a depth map of the imaged scene. For instance, corresponding images (e.g., images captured at the same time or substantially the same time) obtained by different imaging devices can be compared to each other in order to determine the disparities between the images. Based on the disparity information and information regarding the spatial relationships between the imaging devices, the distance between the object and the imaging devices can be determined. For example, the disparity between the image coordinates of the same object in images from different imaging devices can be computed. The distance from the imaging devices to the object can be expressed in terms of the disparity, the focal lengths of the imaging devices, and the spatial relationship between the imaging devices (e.g., distance between the imaging devices). Accordingly, once the focal length and spatial relationship information has been determined (e.g., via the calibration methods described herein), the distance can be computed.

This process can be repeated so as to generate a 3D depth map for all points within the imaged scene. Such depth maps can be used in a wide variety of applications. For example, in embodiments where the imaging devices are carried by a UAV, the depth map generated based on the image data from the imaging devices can be used to provide information indicative of distances of various objects from the UAV. This information can be used to facilitate various UAV functionalities such as obstacle avoidance, navigation, target tracking, and the like.

The systems, devices, and methods described herein can be applied to a wide variety of movable objects. As previously mentioned, any description herein of an aerial vehicle may apply to and be used for any movable object. A movable object of the present invention can be configured to move within any suitable environment, such as in air (e.g., a fixed-wing aircraft, a rotary-wing aircraft, or an aircraft having neither fixed wings nor rotary wings), in water (e.g., a ship or a submarine), on ground (e.g., a motor vehicle, such as a car, truck, bus, van, motorcycle; a movable structure or frame such as a stick, fishing pole; or a train), under the ground (e.g., a subway), in space (e.g., a spaceplane, a satellite, or a probe), or any combination of these environments. The movable object can be a vehicle, such as a vehicle described elsewhere herein. In some embodiments, the movable object can be mounted on a living subject, such as a human or an animal. Suitable animals can include avians, canines, felines, equines, bovines, ovines, porcines, delphines, rodents, or insects.

The movable object may be capable of moving freely within the environment with respect to six degrees of freedom (e.g., three degrees of freedom in translation and three degrees of freedom in rotation). Alternatively, the movement of the movable object can be constrained with respect to one or more degrees of freedom, such as by a predetermined path, track, or orientation. The movement can be actuated by any suitable actuation mechanism, such as an engine or a motor. The actuation mechanism of the movable object can be powered by any suitable energy source, such as electrical energy, magnetic energy, solar energy, wind energy, gravitational energy, chemical energy, nuclear energy, or any suitable combination thereof. The movable object may be self-propelled via a propulsion system, as described elsewhere herein. The propulsion system may optionally run on an energy source, such as electrical energy, magnetic energy, solar energy, wind energy, gravitational energy, chemical energy, nuclear energy, or any suitable combination thereof. Alternatively, the movable object may be carried by a living being.

In some instances, the movable object can be a vehicle. Suitable vehicles may include water vehicles, aerial vehicles, space vehicles, or ground vehicles. For example, aerial vehicles may be fixed-wing aircraft (e.g., airplane, gliders), rotary-wing aircraft (e.g., helicopters, rotorcraft), aircraft having both fixed wings and rotary wings, or aircraft having neither (e.g., blimps, hot air balloons). A vehicle can be self-propelled, such as self-propelled through the air, on or in water, in space, or on or under the ground. A self-propelled vehicle can utilize a propulsion system, such as a propulsion system including one or more engines, motors, wheels, axles, magnets, rotors, propellers, blades, nozzles, or any suitable combination thereof. In some instances, the propulsion system can be used to enable the movable object to take off from a surface, land on a surface, maintain its current position and/or orientation (e.g., hover), change orientation, and/or change position.

The movable object can be controlled remotely by a user or controlled locally by an occupant within or on the movable object. In some embodiments, the movable object is an unmanned movable object, such as a UAV. An unmanned movable object, such as a UAV, may not have an occupant onboard the movable object. The movable object can be controlled by a human or an autonomous control system (e.g., a computer control system), or any suitable combination thereof. The movable object can be an autonomous or semi-autonomous robot, such as a robot configured with an artificial intelligence.

The movable object can have any suitable size and/or dimensions. In some embodiments, the movable object may be of a size and/or dimensions to have a human occupant within or on the vehicle. Alternatively, the movable object may be of size and/or dimensions smaller than that capable of having a human occupant within or on the vehicle. The movable object may be of a size and/or dimensions suitable for being lifted or carried by a human. Alternatively, the movable object may be larger than a size and/or dimensions suitable for being lifted or carried by a human. In some instances, the movable object may have a maximum dimension (e.g., length, width, height, diameter, diagonal) of less than or equal to about: 2 cm, 5 cm, 10 cm, 50 cm, 1 m, 2 m, 5 m, or 10 m. The maximum dimension may be greater than or equal to about: 2 cm, 5 cm, 10 cm, 50 cm, 1 m, 2 m, 5 m, or 10 m. For example, the distance between shafts of opposite rotors of the movable object may be less than or equal to about: 2 cm, 5 cm, 10 cm, 50 cm, 1 m, 2 m, 5 m, or 10 m. Alternatively, the distance between shafts of opposite rotors may be greater than or equal to about: 2 cm, 5 cm, 10 cm, 50 cm, 1 m, 2 m, 5 m, or 10 m.

In some embodiments, the movable object may have a volume of less than 100 cm×100 cm×100 cm, less than 50 cm×50 cm×30 cm, or less than 5 cm×5 cm×3 cm. The total volume of the movable object may be less than or equal to about: 1 $cm^3$, 2 $cm^3$, 5 $cm^3$, 10 $cm^3$, 20 $cm^3$, 30 $cm^3$, 40 $cm^3$, 50 $cm^3$, 60 $cm^3$, 70 $cm^3$, 80 $cm^3$, 90 $cm^3$, 100 $cm^3$, 150 $cm^3$, 200 $cm^3$, 300 cm, 500 $cm^3$, 750 $cm^3$, 1000 $cm^3$, 5000 $cm^3$, 10,000 $cm^3$, 100,000 $cm^3$, 1 $m^3$, or 10 $m^3$. Conversely, the total volume of the movable object may be greater than or equal to about: 1 $cm^3$, 2 $cm^3$, 5 $cm^3$, 10 $cm^3$, 20 $cm^3$, 30 $cm^3$, 40 $cm^3$, 50 $cm^3$, 60 $cm^3$, 70 $cm^3$, 80 $cm^3$, 90 $cm^3$, 100 $cm^3$, 150 $cm^3$, 200 $cm^3$, 300 cm, 500 $cm^3$, 750 $cm^3$, 1000 $cm^3$, 5000 $cm^3$, 10,000 $cm^3$, 100,000 $cm^3$, 1 $m^3$, or 10 $m^3$.

In some embodiments, the movable object may have a footprint (which may refer to the lateral cross-sectional area encompassed by the movable object) less than or equal to about: 32,000 $cm^2$, 20,000 $cm^2$, 10,000 $cm^2$, 1,000 $cm^2$, 500 $cm^2$, 100 $cm^2$, 50 $cm^2$, 10 $cm^2$, or 5 $cm^2$. Conversely, the footprint may be greater than or equal to about: 32,000 $cm^2$, 20,000 $cm^2$, 10,000 $cm^2$, 1,000 $cm^2$, 500 $cm^2$, 100 $cm^2$, 50 $cm^2$, 10 $cm^2$, or 5 $cm^2$.

In some instances, the movable object may weigh no more than 1000 kg. The weight of the movable object may be less than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg. Conversely, the weight may be greater than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg.

In some embodiments, a movable object may be small relative to a load carried by the movable object. The load may include a payload and/or a carrier, as described in further detail below. In some examples, a ratio of a movable object weight to a load weight may be greater than, less than, or equal to about 1:1. In some instances, a ratio of a movable object weight to a load weight may be greater than, less than, or equal to about 1:1. Optionally, a ratio of a carrier weight to a load weight may be greater than, less than, or equal to about 1:1. When desired, the ratio of an movable object weight to a load weight may be less than or equal to: 1:2, 1:3, 1:4, 1:5, 1:10, or even less. Conversely, the ratio of a movable object weight to a load weight can also be greater than or equal to: 2:1, 3:1, 4:1, 5:1, 10:1, or even greater.

In some embodiments, the movable object may have low energy consumption. For example, the movable object may use less than about: 5 W/h, 4 W/h, 3 W/h, 2 W/h, 1 W/h, or less. In some instances, a carrier of the movable object may have low energy consumption. For example, the carrier may use less than about: 5 W/h, 4 W/h, 3 W/h, 2 W/h, 1 W/h, or less. Optionally, a payload of the movable object may have low energy consumption, such as less than about: 5 W/h, 4 W/h, 3 W/h, 2 W/h, 1 W/h, or less.

Figure 20:
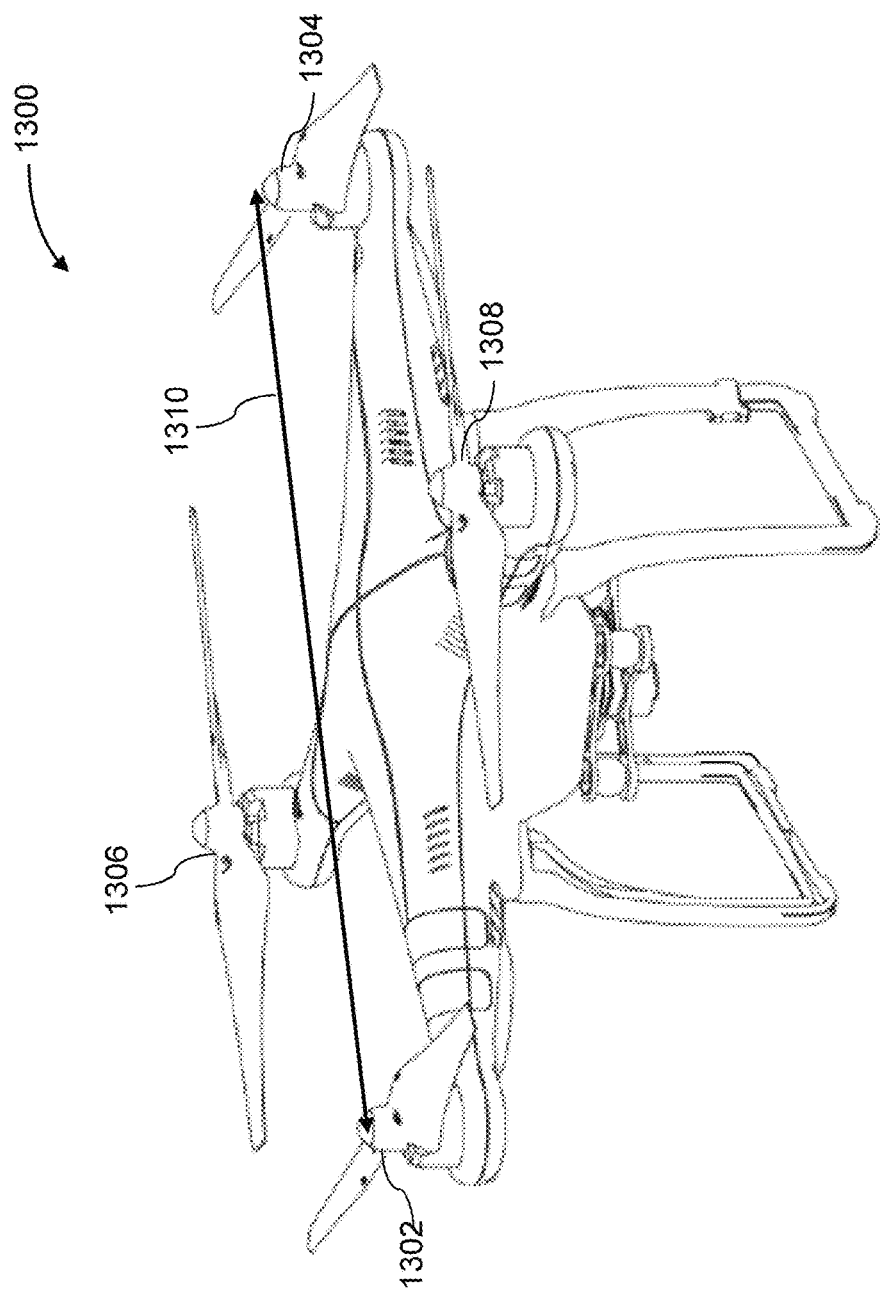
FIG. 20 illustrates a UAV, in accordance with embodiments.

FIG. 20 illustrates an unmanned aerial vehicle (UAV) 1300, in accordance with embodiments of the present invention. The UAV may be an example of a movable object as described herein. The UAV 1300 can include a propulsion system having four rotors 1302, 1304, 1306, and 1308. Any number of rotors may be provided (e.g., one, two, three, four, five, six, or more). The rotors can be embodiments of the self-tightening rotors described elsewhere herein. The rotors, rotor assemblies, or other propulsion systems of the unmanned aerial vehicle may enable the unmanned aerial vehicle to hover/maintain position, change orientation, and/or change location. The distance between shafts of opposite rotors can be any suitable length 1310. For example, the length 1310 can be less than or equal to 2 m, or less than equal to 5 m. In some embodiments, the length 1310 can be within a range from 40 cm to 1 m, from 10 cm to 2 m, or from 5 cm to 5 m. Any description herein of a UAV may apply to a movable object, such as a movable object of a different type, and vice versa.

In some embodiments, the movable object can be configured to carry a load. The load can include one or more of passengers, cargo, equipment, instruments, and the like. The load can be provided within a housing. The housing may be separate from a housing of the movable object, or be part of a housing for an movable object. Alternatively, the load can be provided with a housing while the movable object does not have a housing. Alternatively, portions of the load or the entire load can be provided without a housing. The load can be rigidly fixed relative to the movable object. Optionally, the load can be movable relative to the movable object (e.g., translatable or rotatable relative to the movable object).

In some embodiments, the load includes a payload. The payload can be configured not to perform any operation or function. Alternatively, the payload can be a payload configured to perform an operation or function, also known as a functional payload. For example, the payload can include one or more sensors for surveying one or more targets. Any suitable sensor can be incorporated into the payload, such as an image capture device (e.g., a camera), an audio capture device (e.g., a parabolic microphone), an infrared imaging device, or an ultraviolet imaging device. The sensor can provide static sensing data (e.g., a photograph) or dynamic sensing data (e.g., a video). In some embodiments, the sensor provides sensing data for the target of the payload. Alternatively or in combination, the payload can include one or more emitters for providing signals to one or more targets. Any suitable emitter can be used, such as an illumination source or a sound source. In some embodiments, the payload includes one or more transceivers, such as for communication with a module remote from the movable object. Optionally, the payload can be configured to interact with the environment or a target. For example, the payload can include a tool, instrument, or mechanism capable of manipulating objects, such as a robotic arm.

Optionally, the load may include a carrier. The carrier can be provided for the payload and the payload can be coupled to the movable object via the carrier, either directly (e.g., directly contacting the movable object) or indirectly (e.g., not contacting the movable object). Conversely, the payload can be mounted on the movable object without requiring a carrier. The payload can be integrally formed with the carrier. Alternatively, the payload can be releasably coupled to the carrier. In some embodiments, the payload can include one or more payload elements, and one or more of the payload elements can be movable relative to the movable object and/or the carrier, as described above.

The carrier can be integrally formed with the movable object. Alternatively, the carrier can be releasably coupled to the movable object. The carrier can be coupled to the movable object directly or indirectly. The carrier can provide support to the payload (e.g., carry at least part of the weight of the payload). The carrier can include a suitable mounting structure (e.g., a gimbal platform) capable of stabilizing and/or directing the movement of the payload. In some embodiments, the carrier can be adapted to control the state of the payload (e.g., position and/or orientation) relative to the movable object. For example, the carrier can be configured to move relative to the movable object (e.g., with respect to one, two, or three degrees of translation and/or one, two, or three degrees of rotation) such that the payload maintains its position and/or orientation relative to a suitable reference frame regardless of the movement of the movable object. The reference frame can be a fixed reference frame (e.g., the surrounding environment). Alternatively, the reference frame can be a moving reference frame (e.g., the movable object, a payload target).

In some embodiments, the carrier can be configured to permit movement of the payload relative to the carrier and/or movable object. The movement can be a translation with respect to up to three degrees of freedom (e.g., along one, two, or three axes) or a rotation with respect to up to three degrees of freedom (e.g., about one, two, or three axes), or any suitable combination thereof.

In some instances, the carrier can include a carrier frame assembly and a carrier actuation assembly. The carrier frame assembly can provide structural support to the payload. The carrier frame assembly can include individual carrier frame components, some of which can be movable relative to one another. The carrier actuation assembly can include one or more actuators (e.g., motors) that actuate movement of the individual carrier frame components. The actuators can permit the movement of multiple carrier frame components simultaneously, or may be configured to permit the movement of a single carrier frame component at a time. The movement of the carrier frame components can produce a corresponding movement of the payload. For example, the carrier actuation assembly can actuate a rotation of one or more carrier frame components about one or more axes of rotation (e.g., roll axis, pitch axis, or yaw axis). The rotation of the one or more carrier frame components can cause a payload to rotate about one or more axes of rotation relative to the movable object. Alternatively or in combination, the carrier actuation assembly can actuate a translation of one or more carrier frame components along one or more axes of translation, and thereby produce a translation of the payload along one or more corresponding axes relative to the movable object.

In some embodiments, the movement of the movable object, carrier, and payload relative to a fixed reference frame (e.g., the surrounding environment) and/or to each other, can be controlled by a terminal. The terminal can be a remote control device at a location distant from the movable object, carrier, and/or payload. The terminal can be disposed on or affixed to a support platform. Alternatively, the terminal can be a handheld or wearable device. For example, the terminal can include a smartphone, tablet, laptop, computer, glasses, gloves, helmet, microphone, or suitable combinations thereof. The terminal can include a user interface, such as a keyboard, mouse, joystick, touchscreen, or display. Any suitable user input can be used to interact with the terminal, such as manually entered commands, voice control, gesture control, or position control (e.g., via a movement, location or tilt of the terminal).

The terminal can be used to control any suitable state of the movable object, carrier, and/or payload. For example, the terminal can be used to control the position and/or orientation of the movable object, carrier, and/or payload relative to a fixed reference from and/or to each other. In some embodiments, the terminal can be used to control individual elements of the movable object, carrier, and/or payload, such as the actuation assembly of the carrier, a sensor of the payload, or an emitter of the payload. The terminal can include a wireless communication device adapted to communicate with one or more of the movable object, carrier, or payload.

The terminal can include a suitable display unit for viewing information of the movable object, carrier, and/or payload. For example, the terminal can be configured to display information of the movable object, carrier, and/or payload with respect to position, translational velocity, translational acceleration, orientation, angular velocity, angular acceleration, or any suitable combinations thereof. In some embodiments, the terminal can display information provided by the payload, such as data provided by a functional payload (e.g., images recorded by a camera or other image capturing device).

Optionally, the same terminal may both control the movable object, carrier, and/or payload, or a state of the movable object, carrier and/or payload, as well as receive and/or display information from the movable object, carrier and/or payload. For example, a terminal may control the positioning of the payload relative to an environment, while displaying image data captured by the payload, or information about the position of the payload. Alternatively, different terminals may be used for different functions. For example, a first terminal may control movement or a state of the movable object, carrier, and/or payload while a second terminal may receive and/or display information from the movable object, carrier, and/or payload. For example, a first terminal may be used to control the positioning of the payload relative to an environment while a second terminal displays image data captured by the payload. Various communication modes may be utilized between a movable object and an integrated terminal that both controls the movable object and receives data, or between the movable object and multiple terminals that both control the movable object and receives data. For example, at least two different communication modes may be formed between the movable object and the terminal that both controls the movable object and receives data from the movable object.

Figure 21:
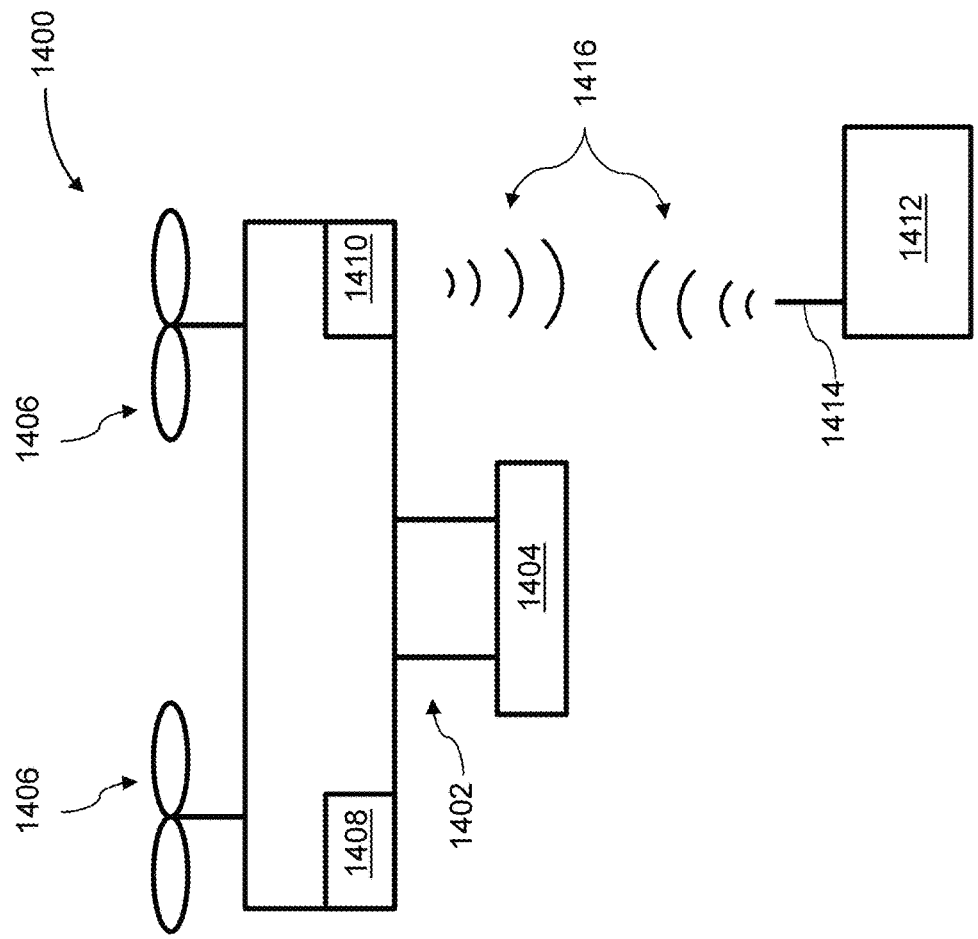
FIG. 21 illustrates a movable object including a carrier and a payload, in accordance with embodiments.

FIG. 21 illustrates a movable object 1400 including a carrier 1402 and a payload 1404, in accordance with embodiments. Although the movable object 1400 is depicted as an aircraft, this depiction is not intended to be limiting, and any suitable type of movable object can be used, as previously described herein. One of skill in the art would appreciate that any of the embodiments described herein in the context of aircraft systems can be applied to any suitable movable object (e.g., an UAV). In some instances, the payload 1404 may be provided on the movable object 1400 without requiring the carrier 1402. The movable object 1400 may include propulsion mechanisms 1406, a sensing system 1408, and a communication system 1410.

The propulsion mechanisms 1406 can include one or more of rotors, propellers, blades, engines, motors, wheels, axles, magnets, or nozzles, as previously described. For example, the propulsion mechanisms 1406 may be self-tightening rotors, rotor assemblies, or other rotary propulsion units, as disclosed elsewhere herein. The movable object may have one or more, two or more, three or more, or four or more propulsion mechanisms. The propulsion mechanisms may all be of the same type. Alternatively, one or more propulsion mechanisms can be different types of propulsion mechanisms. The propulsion mechanisms 1406 can be mounted on the movable object 1400 using any suitable means, such as a support element (e.g., a drive shaft) as described elsewhere herein. The propulsion mechanisms 1406 can be mounted on any suitable portion of the movable object 1400, such on the top, bottom, front, back, sides, or suitable combinations thereof.

In some embodiments, the propulsion mechanisms 1406 can enable the movable object 1400 to take off vertically from a surface or land vertically on a surface without requiring any horizontal movement of the movable object 1400 (e.g., without traveling down a runway). Optionally, the propulsion mechanisms 1406 can be operable to permit the movable object 1400 to hover in the air at a specified position and/or orientation. One or more of the propulsion mechanisms 1400 may be controlled independently of the other propulsion mechanisms. Alternatively, the propulsion mechanisms 1400 can be configured to be controlled simultaneously. For example, the movable object 1400 can have multiple horizontally oriented rotors that can provide lift and/or thrust to the movable object. The multiple horizontally oriented rotors can be actuated to provide vertical takeoff, vertical landing, and hovering capabilities to the movable object 1400. In some embodiments, one or more of the horizontally oriented rotors may spin in a clockwise direction, while one or more of the horizontally rotors may spin in a counterclockwise direction. For example, the number of clockwise rotors may be equal to the number of counterclockwise rotors. The rotation rate of each of the horizontally oriented rotors can be varied independently in order to control the lift and/or thrust produced by each rotor, and thereby adjust the spatial disposition, velocity, and/or acceleration of the movable object 1400 (e.g., with respect to up to three degrees of translation and up to three degrees of rotation).

The sensing system 1408 can include one or more sensors that may sense the spatial disposition, velocity, and/or acceleration of the movable object 1400 (e.g., with respect to up to three degrees of translation and up to three degrees of rotation). The one or more sensors can include global positioning system (GPS) sensors, motion sensors, inertial sensors, proximity sensors, or image sensors. The sensing data provided by the sensing system 1408 can be used to control the spatial disposition, velocity, and/or orientation of the movable object 1400 (e.g., using a suitable processing unit and/or control module, as described below). Alternatively, the sensing system 1408 can be used to provide data regarding the environment surrounding the movable object, such as weather conditions, proximity to potential obstacles, location of geographical features, location of manmade structures, and the like.

The communication system 1410 enables communication with terminal 1412 having a communication system 1414 via wireless signals 1416. The communication systems 1410, 1414 may include any number of transmitters, receivers, and/or transceivers suitable for wireless communication. The communication may be one-way communication, such that data can be transmitted in only one direction. For example, one-way communication may involve only the movable object 1400 transmitting data to the terminal 1412, or vice-versa. The data may be transmitted from one or more transmitters of the communication system 1410 to one or more receivers of the communication system 1412, or vice-versa. Alternatively, the communication may be two-way communication, such that data can be transmitted in both directions between the movable object 1400 and the terminal 1412. The two-way communication can involve transmitting data from one or more transmitters of the communication system 1410 to one or more receivers of the communication system 1414, and vice-versa.

In some embodiments, the terminal 1412 can provide control data to one or more of the movable object 1400, carrier 1402, and payload 1404 and receive information from one or more of the movable object 1400, carrier 1402, and payload 1404 (e.g., position and/or motion information of the movable object, carrier or payload; data sensed by the payload such as image data captured by a payload camera). In some instances, control data from the terminal may include instructions for relative positions, movements, actuations, or controls of the movable object, carrier and/or payload. For example, the control data may result in a modification of the location and/or orientation of the movable object (e.g., via control of the propulsion mechanisms 1406), or a movement of the payload with respect to the movable object (e.g., via control of the carrier 1402). The control data from the terminal may result in control of the payload, such as control of the operation of a camera or other image capturing device (e.g., taking still or moving pictures, zooming in or out, turning on or off, switching imaging modes, change image resolution, changing focus, changing depth of field, changing exposure time, changing viewing angle or field of view). In some instances, the communications from the movable object, carrier and/or payload may include information from one or more sensors (e.g., of the sensing system 1408 or of the payload 1404). The communications may include sensed information from one or more different types of sensors (e.g., GPS sensors, motion sensors, inertial sensor, proximity sensors, or image sensors). Such information may pertain to the position (e.g., location, orientation), movement, or acceleration of the movable object, carrier and/or payload. Such information from a payload may include data captured by the payload or a sensed state of the payload. The control data provided transmitted by the terminal 1412 can be configured to control a state of one or more of the movable object 1400, carrier 1402, or payload 1404. Alternatively or in combination, the carrier 1402 and payload 1404 can also each include a communication module configured to communicate with terminal 1412, such that the terminal can communicate with and control each of the movable object 1400, carrier 1402, and payload 1404 independently.

In some embodiments, the movable object 1400 can be configured to communicate with another remote device in addition to the terminal 1412, or instead of the terminal 1412. The terminal 1412 may also be configured to communicate with another remote device as well as the movable object 1400. For example, the movable object 1400 and/or terminal 1412 may communicate with another movable object, or a carrier or payload of another movable object. When desired, the remote device may be a second terminal or other computing device (e.g., computer, laptop, tablet, smartphone, or other mobile device). The remote device can be configured to transmit data to the movable object 1400, receive data from the movable object 1400, transmit data to the terminal 1412, and/or receive data from the terminal 1412. Optionally, the remote device can be connected to the Internet or other telecommunications network, such that data received from the movable object 1400 and/or terminal 1412 can be uploaded to a website or server.

Figure 22:
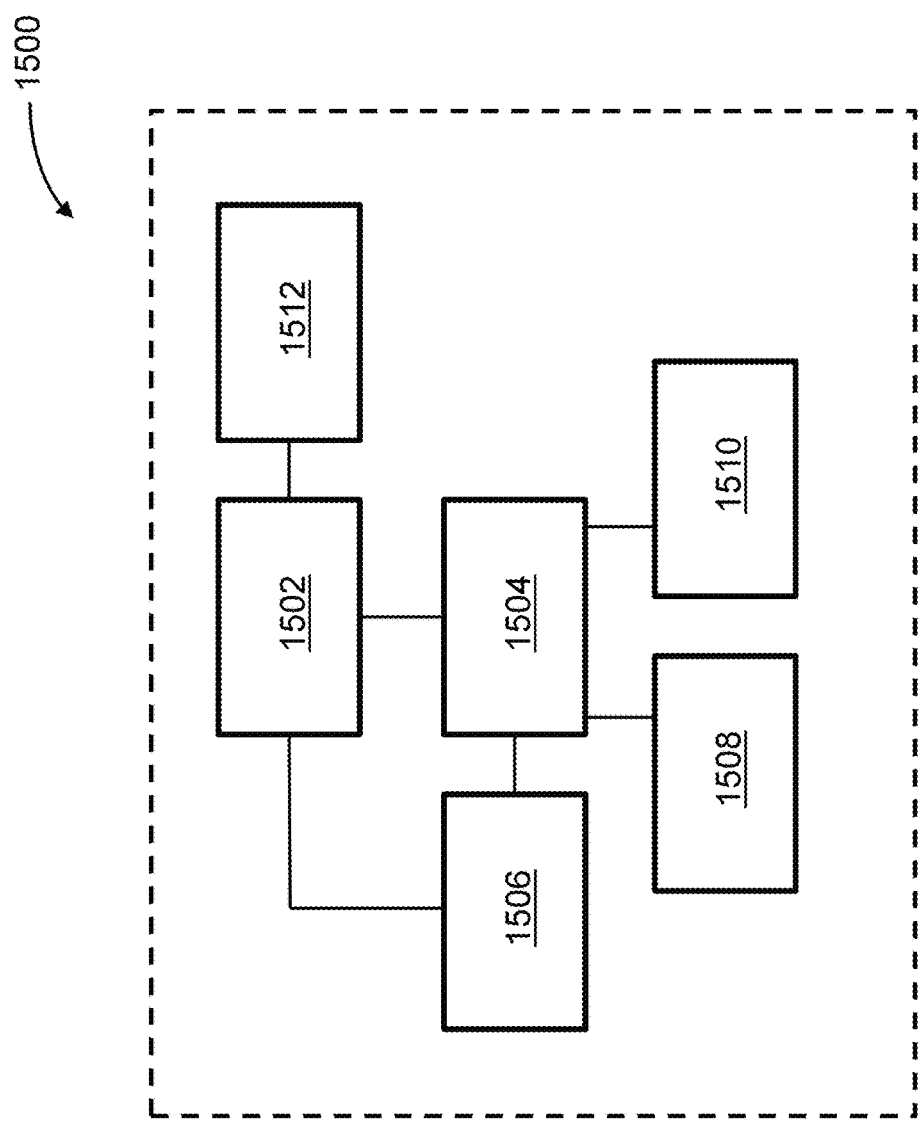
FIG. 22 illustrates a system for controlling a movable object, in accordance with embodiments.

FIG. 22 is a schematic illustration by way of block diagram of a system 1500 for controlling a movable object, in accordance with embodiments. The system 1500 can be used in combination with any suitable embodiment of the systems, devices, and methods disclosed herein. The system 1500 can include a sensing module 1502, processing unit 1504, non-transitory computer readable medium 1506, control module 1508, and communication module 1510.

The sensing module 1502 can utilize different types of sensors that collect information relating to the movable objects in different ways. Different types of sensors may sense different types of signals or signals from different sources. For example, the sensors can include inertial sensors, GPS sensors, proximity sensors (e.g., lidar), or vision/image sensors (e.g., a camera). The sensing module 1502 can be operatively coupled to a processing unit 1504 having a plurality of processors. In some embodiments, the sensing module can be operatively coupled to a transmission module 1512 (e.g., a Wi-Fi image transmission module) configured to directly transmit sensing data to a suitable external device or system. For example, the transmission module 1512 can be used to transmit images captured by a camera of the sensing module 1502 to a remote terminal.

The processing unit 1504 can have one or more processors, such as a programmable processor (e.g., a central processing unit (CPU)). The processing unit 1504 can be operatively coupled to a non-transitory computer readable medium 1506. The non-transitory computer readable medium 1506 can store logic, code, and/or program instructions executable by the processing unit 1504 for performing one or more steps. The non-transitory computer readable medium can include one or more memory units (e.g., removable media or external storage such as an SD card or random access memory (RAM)). In some embodiments, data from the sensing module 1502 can be directly conveyed to and stored within the memory units of the non-transitory computer readable medium 1506. The memory units of the non-transitory computer readable medium 1506 can store logic, code and/or program instructions executable by the processing unit 1504 to perform any suitable embodiment of the methods described herein. For example, the processing unit 1504 can be configured to execute instructions causing one or more processors of the processing unit 1504 to analyze sensing data produced by the sensing module. The memory units can store sensing data from the sensing module to be processed by the processing unit 1504. In some embodiments, the memory units of the non-transitory computer readable medium 1506 can be used to store the processing results produced by the processing unit 1504.

In some embodiments, the processing unit 1504 can be operatively coupled to a control module 1508 configured to control a state of the movable object. For example, the control module 1508 can be configured to control the propulsion mechanisms of the movable object to adjust the spatial disposition, velocity, and/or acceleration of the movable object with respect to six degrees of freedom. Alternatively or in combination, the control module 1508 can control one or more of a state of a carrier, payload, or sensing module.

The processing unit 1504 can be operatively coupled to a communication module 1510 configured to transmit and/or receive data from one or more external devices (e.g., a terminal, display device, or other remote controller). Any suitable means of communication can be used, such as wired communication or wireless communication. For example, the communication module 1510 can utilize one or more of local area networks (LAN), wide area networks (WAN), infrared, radio, WiFi, point-to-point (P2P) networks, telecommunication networks, cloud communication, and the like. Optionally, relay stations, such as towers, satellites, or mobile stations, can be used. Wireless communications can be proximity dependent or proximity independent. In some embodiments, line-of-sight may or may not be required for communications. The communication module 1510 can transmit and/or receive one or more of sensing data from the sensing module 1502, processing results produced by the processing unit 1504, predetermined control data, user commands from a terminal or remote controller, and the like.

The components of the system 1500 can be arranged in any suitable configuration. For example, one or more of the components of the system 1500 can be located on the movable object, carrier, payload, terminal, sensing system, or an additional external device in communication with one or more of the above. Additionally, although FIG. 22 depicts a single processing unit 1504 and a single non-transitory computer readable medium 1506, one of skill in the art would appreciate that this is not intended to be limiting, and that the system 1500 can include a plurality of processing units and/or non-transitory computer readable media. In some embodiments, one or more of the plurality of processing units and/or non-transitory computer readable media can be situated at different locations, such as on the movable object, carrier, payload, terminal, sensing module, additional external device in communication with one or more of the above, or suitable combinations thereof, such that any suitable aspect of the processing and/or memory functions performed by the system 1500 can occur at one or more of the aforementioned locations.

As used herein A and/or B encompasses one or more of A or B, and combinations thereof such as A and B.

The specific dimensions of any of the apparatuses, devices, systems, and components thereof, of the present disclosure can be readily varied depending upon the intended application, as will be apparent to those of skill in the art in view of the disclosure herein. Moreover, it is understood that the embodiments described herein are for illustrative purposes only and that various modifications or changes in light thereof can be suggested to persons skilled in the art and are included within the spirit and purview of this application and scope of the appended claims. Numerous different combinations of embodiments described herein are possible, and such combinations are considered part of the present disclosure. In addition, all features discussed in connection with any one embodiment herein can be readily adapted for use in other embodiments herein.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A method for calibrating one or more imaging devices carried by an unmanned aerial vehicle (UAV), the method comprising:

receiving, from the one or more imaging devices, a plurality of images of a calibration target, the calibration target comprising a plurality of features arranged in a repeating pattern and a plurality of reference markers, wherein the plurality of reference markers are each uniquely identifiable in each image of the plurality of images, wherein each of the plurality of reference markers on the calibration target forms one of vertices of an irregular polygon on the calibration target with no more than two of the plurality of reference markers being on a same line, wherein each of the plurality of reference markers in each image of the plurality of images forms one of vertices of an irregular polygon in the each image of the plurality of images, and wherein the plurality of images comprises at least one image capturing less than all of the plurality of features;

determining, with aid of one or more processors, a spatial relationship between the plurality of reference markers in each image of the plurality of images and the plurality of reference markers on the calibration target, comprising identifying a correspondence between the vertices of the irregular polygon in the each image of the plurality of images and the vertices of the irregular polygon on the calibration target;

formulating, based on the spatial relationship and with aid of one or more processors, a correspondence between image coordinates of features in each image of the plurality of images and global coordinates for corresponding features on the calibration target;

determining, based on the correspondence and with aid of the one or more processors, calibration parameters for the one or more imaging devices; and generating, based on the determined calibration parameters for the one or more imaging devices, a 3D representation of an environment of the UAV based on the calibration parameters.

2. The method of claim 1, wherein the plurality of images from each of the one or more imaging devices are taken at different positions and orientations relative to the calibration target.

3. The method of claim 1, wherein the calibration target is a checkerboard comprising a plurality of squares and the plurality of features comprises corner points of the plurality of squares.

4. The method of claim 3, wherein the plurality of reference markers are each positioned within one of the plurality of squares.

5. The method of claim 3, wherein the plurality of features comprises four outer corners of the checkerboard and the at least one image omits at least one of the four outer corners.

6. The method of claim 1, wherein the plurality of features are arranged in the repeating pattern over a plane and wherein the plurality of reference markers form a shape that is rotationally asymmetric within the plane.

7. The method of claim 1, wherein the calibration parameters comprise at least one of a focal length, a position of the principal point, pixel size, optical distortion for each of the one or more imaging devices, or a position and an orientation of each of the one or more imaging devices relative to the calibration target.

8. A system comprising:

one or more imaging devices carried by an unmanned aerial vehicle (UAV), each configured to capture a plurality of images of a calibration target, the calibration target comprising a plurality of features arranged in a repeating pattern and a plurality of reference markers, wherein the plurality of reference markers are each uniquely identifiable in each image of the plurality of images, wherein each of the plurality of reference markers on the calibration target forms one of vertices of an irregular polygon on the calibration target with no more than two of the plurality of reference markers being on a same line, wherein each of the plurality of reference markers in each image of the plurality of images forms one of vertices of an irregular polygon in the each image of the plurality of images, and wherein the plurality of images comprises at least one image capturing less than all of the plurality of features; and one or more processors that are collectively or individually configured to:
  receive the plurality of images from the one or more imaging devices;
  determine a spatial relationship between the plurality of reference markers in each image of the plurality of images and the plurality of reference markers on the calibration target, comprising identifying a correspondence between the vertices of the irregular polygon in the each image of the plurality of images and the vertices of the irregular polygon on the calibration target;
  formulate a correspondence between image coordinates of features in each image of the plurality of images and global coordinates for corresponding features on the calibration target based on the spatial relationship;
  determine calibration parameters for the one or more imaging devices based on the correspondence; and
  generate, based on the determined calibration parameters for the one or more imaging devices, a 3D representation of an environment of the UAV based on the calibration parameters.

9. The system of claim 8, wherein the plurality of images from each of the one or more imaging devices are taken at different positions and orientations relative to the calibration target.

10. The system of claim 8, wherein the calibration target is a checkerboard comprising a plurality of squares and the plurality of features comprises corner points of the plurality of squares.

11. The system of claim 10, wherein the plurality of reference markers are each positioned within one of the plurality of squares.

12. The system of claim 10, wherein the plurality of features comprises four outer corners of the checkerboard and the at least one image omits at least one of the four outer corners.

13. The system of claim 8, wherein the plurality of features are arranged in the repeating pattern over a plane and wherein the plurality of reference markers form a shape that is rotationally asymmetric within the plane.

14. The system of claim 8, wherein the calibration parameters comprise at least one of a focal length, a position of the principal point, pixel size, optical distortion for each of the one or more imaging devices, or a position and an orientation of each of the one or more imaging devices relative to the calibration target.

15. The method of claim 1, wherein the plurality of reference markers consist of no more than three reference markers.

16. The method of claim 1, wherein the step of determining the calibration parameters is performed when the UAV is airborne.

17. The system of claim 8, wherein the plurality of reference markers consist of no more than three reference markers.

18. The system of claim 8, wherein the step of determining the calibration parameters is performed when the UAV is airborne.

19. The method of claim 1, wherein generating the 3D representation of the environment of the UAV comprises:
  processing, using the determined calibration parameters, one or more images of the environment of the UAV obtained by the one or more imaging devices to generate undistorted images of the environment using interpolation; and
  determining spatial information of the environment based on the undistorted images.

20. The method of claim 1, wherein generating the 3D representation of the environment of the UAV comprises:
  processing, using the determined calibration parameters, one or more images of the environment of the UAV obtained by the one or more imaging devices to generate rectified images of the environment; and
  determining spatial information of the environment based on the rectified images.

21. The method of claim 1, wherein at least one of the plurality of reference markers is different from at least another one of the plurality of reference markers in at least one of shape, size, or color.

22. The system of claim 8, wherein at least one of the plurality of reference markers is different from at least another one of the plurality of reference markers in at least one of shape, size, or color.

23. The method of claim 19, wherein grayscale values of pixels in the undistorted images of the environment are obtained by interpolating grayscale values of pixels in the one or more images of the environment obtained by the one or more imaging devices.

24. The method of claim 1, wherein:
  a row position of each of the plurality of reference markers is different from a row position of any other one of the plurality of reference markers; and/or
  a column position of each of the plurality of reference markers is different from a column position of any other one of the plurality of reference markers.

25. The method of claim 3, further comprising, for one image of the plurality of images:
  identifying possible reference markers on the one image; and
  determining the reference markers on the one image based on the possible reference markers.

26. The method of claim 25, wherein determining the reference markers on the one image includes:
  removing, from the possible reference markers, false results that lie outside a convex hull of the corner points to obtain filtered results; and
  determining the reference markers on the one image from the filtered results based on knowledge of relative positioning of the reference markers.

* * * * *